(12) United States Patent
Liu

(10) Patent No.: US 12,412,195 B2
(45) Date of Patent: Sep. 9, 2025

(54) ADVERTISEMENT DISPLAY METHOD AND ELECTRONIC DEVICE

(71) Applicant: Huawei Technologies Co., Ltd., Shenzhen (CN)

(72) Inventor: Lu Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 47 days.

(21) Appl. No.: 18/027,040

(22) PCT Filed: Sep. 13, 2021

(86) PCT No.: PCT/CN2021/117991
§ 371 (c)(1),
(2) Date: Mar. 17, 2023

(87) PCT Pub. No.: WO2022/057764
PCT Pub. Date: Mar. 24, 2022

(65) Prior Publication Data
US 2023/0325884 A1 Oct. 12, 2023

(30) Foreign Application Priority Data
Sep. 19, 2020 (CN) .......................... 202010990422.3

(51) Int. Cl.
G06Q 30/00 (2023.01)
G06N 5/022 (2023.01)
G06Q 30/0251 (2023.01)

(52) U.S. Cl.
CPC ......... *G06Q 30/0269* (2013.01); *G06N 5/022* (2013.01)

(58) Field of Classification Search
None
See application file for complete search history.

(56) References Cited

U.S. PATENT DOCUMENTS

2009/0063475 A1* 3/2009 Pendse ................ G06F 21/6245
707/999.005
2011/0066497 A1* 3/2011 Gopinath ............... G06Q 30/02
705/14.53
(Continued)

FOREIGN PATENT DOCUMENTS

CN 106997549 A 8/2017
CN 109447713 A * 3/2019
(Continued)

OTHER PUBLICATIONS

Safavi, Tara, et al. "Personalized knowledge graph summarization: From the cloud to your pocket." 2019 IEEE International Conference on Data Mining (ICDM). IEEE, 2019. (Year: 2019).*
(Continued)

*Primary Examiner* — Michael Bekerman
(74) *Attorney, Agent, or Firm* — Slater Matsil, LLP

(57) ABSTRACT

The method includes: An electronic device 100 obtains first personal data (S1001); the electronic device 100 constructs a personal knowledge graph based on the first personal data (S1002); the electronic device 100 obtains parameter information of first advertisement content from an advertisement server 200 (S1003); the electronic device 100 obtains parameter information of second advertisement content from the parameter information of the first advertisement content based on the personal knowledge graph (S1004); the electronic device 100 obtains the second advertisement content based on the parameter information of the second advertisement content (S1005); and the electronic device 100 displays the second advertisement content on a display (S1006).

18 Claims, 20 Drawing Sheets

(56) References Cited

U.S. PATENT DOCUMENTS

| | | | | |
|---|---|---|---|---|
| 2013/0268396 | A1* | 10/2013 | Agevik | G06Q 30/0631 |
| | | | | 705/26.7 |
| 2015/0112818 | A1* | 4/2015 | Lombriser | G06Q 30/0277 |
| | | | | 705/14.73 |
| 2016/0180402 | A1* | 6/2016 | Sabah | G06F 16/24578 |
| | | | | 705/14.66 |
| 2017/0024375 | A1* | 1/2017 | Hakkani-Tur | G06F 16/337 |
| 2017/0255862 | A1 | 9/2017 | Li et al. | |
| 2018/0181996 | A1* | 6/2018 | Matthews | G06Q 30/0269 |
| 2020/0065857 | A1* | 2/2020 | Lagi | G06Q 30/0254 |
| 2020/0118010 | A1* | 4/2020 | Lee | G06Q 30/0201 |
| 2021/0042796 | A1* | 2/2021 | Khoury | G06Q 30/0272 |
| 2021/0334857 | A1* | 10/2021 | Stoica | G06Q 30/0242 |
| 2022/0067115 | A1* | 3/2022 | Zheng | G06N 5/04 |

FOREIGN PATENT DOCUMENTS

| | | | | | |
|---|---|---|---|---|---|
| CN | 109800300 | A | * | 5/2019 | |
| CN | 110059249 | A | * | 7/2019 | G06F 16/9035 |
| CN | 110458641 | A | * | 11/2019 | G06F 16/367 |
| CN | 111291191 | A | | 6/2020 | |
| CN | 111768231 | A | * | 10/2020 | G06F 16/367 |
| CN | 112102002 | A | * | 12/2020 | G06F 16/367 |
| CN | 112287125 | A | | 1/2021 | |
| CN | 112805743 | A | * | 5/2021 | G06F 21/6245 |

OTHER PUBLICATIONS

Novak, Jasminko, et al. "Discovering, visualizing, and sharing knowledge through personalized learning knowledge maps." International Symposium on Agent-Mediated Knowledge Management. Berlin, Heidelberg: Springer Berlin Heidelberg, 2003. (Year: 2003).*
Faber, Lukas, et al. "Adaptive personalized knowledge graph summarization." MLG Workshop (with KDD). 2018. (Year: 2018).*
Jiayu Wen:"Research on Personalized Advertising Recommendation Based on Email Platform."Feb. 20, 2020, total 138 pages.
Siraj Munir et al:"An integrated approach: using knowledge graph and network analysis for harnessing digital advertisement."Jan. 22, 2022, total 16 pages.

* cited by examiner

ADVERTISEMENT DISPLAY METHOD AND ELECTRONIC DEVICE

CROSS-REFERENCE TO RELATED APPLICATIONS

This application is a national stage of International Application No. PCT/CN2021/117991, filed on Sep. 13, 2021, which claims priority to Chinese Patent Application No. 202010990422.3, filed on Sep. 19, 2020. Both of the aforementioned applications are hereby incorporated by reference in their entireties.

TECHNICAL FIELD

This application relates to the field of data processing technologies, and in particular, to an advertisement display method and an electronic device.

BACKGROUND

In recent years, with the progress of network technologies, the Internet has become an important part in people's life. With rapid development of the Internet, advertisement content and an advertisement placement manner have changed greatly.

Currently, for the advertisement placement manner, a crowd-targeted, product-oriented, and technology-based placement mode has been formed. A server first collects service data of a user group. For example, the service data may be a type of an advertisement viewed by the user group and viewing duration, and an operation record of closing or ignoring an advertisement by the user group. The server performs group profiling for the user group based on the service data of the user group. A group profiling result may be a type of an advertisement viewed by the user group for a largest quantity of times, a type of an advertisement that the user group is not interested in, or the like. The server screens a plurality of advertisements in an advertisement pool based on the group profiling result. The server sends a ranked advertisement to an electronic device of a user.

In the foregoing advertisement placement manner, an advertisement is pushed by using behavioral characteristics of a large quantity of user groups, but differences between individual users are not considered, for example, the individual users have different preferences and requirements. In the advertisement recommendation manner, there is a recommendation homogeneity problem, and an optimal advertisement placement effect cannot be achieved.

SUMMARY

This application provides an advertisement display method and an electronic device, to implement an advertisement recommendation solution in which a terminal side and a server side cooperate with each other. In this way, an advertisement placement effect of an advertisement provider is optimized, so that advertisement placement by the advertisement provider is more accurate, to increase economic benefits of the advertisement provider. In addition, a personal knowledge graph of a user is constructed by using personal data stored on the terminal side, and therefore the personal knowledge graph of the user can comprehensively describe a behavioral characteristic of the user, and the personal knowledge graph of the user is constructed on the terminal side, and therefore security of private information of the user is protected.

According to a first aspect, this application provides an advertisement display method. The method includes: An electronic device obtains first personal data of a user, where the first personal data is personal information of the user; the electronic device constructs a personal knowledge graph based on the first personal data, where the personal knowledge graph includes the first personal data and a time at which the first personal data is generated; the electronic device obtains parameter information of first advertisement content from an advertisement server, where the parameter information includes types of the first advertisement content and a link address of the first advertisement content, the first advertisement content is obtained by the advertisement server by screening a plurality of advertisements based on group data, and the first advertisement content includes one or more advertisements; the electronic device obtains parameter information of second advertisement content from the parameter information of the first advertisement content based on the personal knowledge graph; the electronic device obtains the second advertisement content based on the parameter information of the second advertisement content, where the second advertisement content includes one or more advertisements; and the electronic device displays the second advertisement content on a display.

The electronic device may obtain the parameter information of the second advertisement content from the parameter information of the first advertisement content based on the personal knowledge graph in one or more of the following manners: Manner 1: The electronic device retains parameter information of all advertisements in the parameter information of the first advertisement content, and the electronic device only ranks the first advertisement content in descending order of predicted preference values of the user for types of the advertisements, to obtain the parameter information of the second advertisement content. Manner 2: The electronic device selects parameter information of some advertisements from the parameter information of the first advertisement content, to obtain the parameter information of the second advertisement content. Specifically, the electronic device ranks the first advertisement content in descending order of predicted preference values of the user for types of advertisements, and retains only parameter information of an advertisement whose predicted preference value of the user is greater than a first threshold, to obtain the parameter information of the second advertisement content.

In the method, the electronic device sends an advertisement recommendation request to the advertisement server; the electronic device receives the parameter information of the first advertisement content returned by the advertisement server; and then the electronic device further screens the parameter information of the first advertisement content, to obtain the parameter information of the second advertisement content.

Specifically, the electronic device constructs the personal knowledge graph of the user by using the obtained personal data, and trains a re-ranking model based on the personal knowledge graph; after the electronic device sends the advertisement recommendation request to the advertisement server, the electronic device receives the parameter information of the first advertisement content sent by the advertisement server; then the electronic device further screens the parameter information of the first advertisement content based on the re-ranking model, to obtain the parameter information of the second advertisement content; and the electronic device obtains the second advertisement content based on the parameter information of the second advertisement content, and recommends the second advertisement content to the user for viewing.

The method implements an advertisement recommendation solution in which a terminal side and a server side cooperate with each other. In this way, an advertisement placement effect of an advertisement provider is optimized, so that advertisement placement by the advertisement provider is more accurate, to increase economic benefits of the advertisement provider. In addition, the personal knowledge graph of the user is constructed by using the personal data stored on the terminal side, and therefore the personal knowledge graph of the user can comprehensively describe a behavioral characteristic of the user, and the personal knowledge graph of the user is constructed on the terminal side, and therefore security of private information of the user is protected.

With reference to the first aspect, in a possible implementation of the first aspect, that the electronic device constructs a personal knowledge graph based on the first personal data specifically includes: The electronic device obtains second personal data from the first personal data, where the second personal data includes relationship knowledge, event knowledge, and entity knowledge; the electronic device stores the relationship knowledge, the event knowledge, and the entity knowledge based on a predetermined structure; and the electronic device constructs the personal knowledge graph of the user based on the relationship knowledge of the predetermined structure, the event knowledge of the predetermined structure, and the entity knowledge of the predetermined structure. In this way, the personal knowledge graph is a data structure that graphically displays an association between personal data. In addition, the personal knowledge graph includes the first personal data and the time at which the first personal data is generated, and the personal knowledge graph may represent a relationship between the personal data and the time, so that the electronic device subsequently updates the personal knowledge graph based on the time.

With reference to the first aspect, in a possible implementation of the first aspect, the first advertisement content is any one or more of the following: a picture, a video, text, and audio. The first advertisement content may further include other content. This is not limited herein in this application.

With reference to the first aspect, in a possible implementation of the first aspect, the electronic device obtains the first personal data of the user at regular intervals. In this way, the electronic device may obtain new first personal data of the user at regular intervals, and add the new first personal data to the personal knowledge graph, to update the personal data of the user in the personal knowledge graph.

With reference to the first aspect, in a possible implementation of the first aspect, the predetermined structure is a 5-tuple structure; and that the electronic device stores the relationship knowledge based on a predetermined structure specifically includes: The electronic device stores the relationship knowledge based on a first 5-tuple structure, where the first 5-tuple structure is "first entity-relationship-second entity-first time point-first time interval", the relationship represents a relationship between the first entity and the second entity, the first time point is a time at which the relationship is established between the first entity and the second entity, and the first time interval is a time interval between the first time point and a current time point. In this way, the electronic device stores the relationship knowledge of the user as the predetermined structure, to facilitate subsequent construction of the personal knowledge graph. In addition, the first 5-tuple that represents the relationship knowledge includes the first time point and the first time interval, and the electronic device may update the relationship knowledge of the user based on the first time point and the first time interval.

With reference to the first aspect, in a possible implementation of the first aspect, the predetermined structure is a 5-tuple structure; and that the electronic device stores the event knowledge based on a predetermined structure specifically includes: The electronic device stores the event knowledge based on a second 5-tuple structure, where the second 5-tuple structure is "event-argument-logical relationship-second time point-second time interval", the argument is an occurrence action of the event, the logical relationship represents a relationship between the event and the argument, the second time point is a time at which the event occurs, and the second time interval is a time interval between the second time point and a current time point. In this way, the electronic device stores the event knowledge of the user as the predetermined structure, to facilitate subsequent construction of the personal knowledge graph. In addition, the second 5-tuple that represents the event knowledge includes the second time point and the second time interval, and the electronic device may update the event knowledge of the user based on the second time point and the second time interval.

With reference to the first aspect, in a possible implementation of the first aspect, the predetermined structure is a 5-tuple structure; and that the electronic device stores the entity knowledge based on a predetermined structure specifically includes: The electronic device stores the entity knowledge based on a third 5-tuple structure, where the third 5-tuple structure is "third entity: third time point-first association weight-fourth entity-second association weight-fifth entity", the third time point is a time at which the third entity occurs, the first association weight is a degree of association between the third entity and the fourth entity, and the second association weight is a degree of association between the fourth entity and the fifth entity. In this way, the electronic device stores the entity knowledge of the user as the predetermined structure, to facilitate subsequent construction of the personal knowledge graph. In addition, the third 5-tuple that represents the entity knowledge includes the third time point and the third time interval, and the electronic device may update the entity knowledge of the user based on the third time point and the third time interval.

With reference to the first aspect, in a possible implementation of the first aspect, the electronic device deletes the relationship knowledge whose first time interval is greater than a first threshold from the personal knowledge graph; and/or the electronic device deletes the event knowledge whose second time interval is greater than the first threshold from the personal knowledge graph; and/or the electronic device determines a third time interval between the third time point and the current time point based on the third time point; and the electronic device deletes the entity knowledge whose third time interval is greater than the first threshold from the personal knowledge graph. In this way, the electronic device may delete user knowledge whose time interval is greater than the first threshold from the personal knowledge graph based on time, and remove user knowledge in an early time period. Therefore, the personal knowledge graph can better represent a behavioral characteristic of the user in a recent time period.

With reference to the first aspect, in a possible implementation of the first aspect, after the electronic device constructs the personal knowledge graph based on the first personal data of the user, the method further includes: The electronic device obtains a historical behavior of the user and historical advertisement information displayed by the electronic device; the electronic device uses the historical advertisement information and the personal knowledge graph as an input to the re-ranking model, where the re-ranking model outputs a first result; and the electronic device compares the first result with the historical behavior of the user, and modifies a parameter of the re-ranking model until the first result that is output by the re-ranking model falls within a preset range, to obtain a first model; and that the electronic device obtains parameter information of second advertisement content from the parameter information of the first advertisement content based on the personal knowledge graph specifically includes: The electronic device obtains the parameter information of the second advertisement content from the parameter information of the first advertisement content based on the first model. In this way, the electronic device trains the re-ranking model based on the personal knowledge graph, to obtain the first model. The electronic device may obtain the parameter information of the second advertisement content from the parameter information of the first advertisement content based on the first model.

With reference to the first aspect, in a possible implementation of the first aspect, that the electronic device obtains the parameter information of the second advertisement content from the parameter information of the first advertisement content based on the first model specifically includes: The electronic device ranks the types of the first advertisement content in descending order of predicted preference values of the user based on the first model, to obtain the parameter information of the second advertisement content; or the electronic device ranks the types of the first advertisement content in descending order of predicted preference values of the user based on the first model, and obtains a type of an advertisement whose predicted preference value of the user is greater than the first threshold, to obtain the parameter information of the second advertisement content. In this way, the electronic device obtains the parameter information of the second advertisement content from the parameter information of the first advertisement content based on the predicted preference value of the user, so that the advertisement displayed by the electronic device better meets a preference of the user. In this way, an advertisement recommendation effect can be improved.

With reference to the first aspect, in a possible implementation of the first aspect, before the electronic device obtains the second personal data from the first personal data, the method further includes: The electronic device converts the first personal data into text information; and the electronic device performs sentence segmentation, word segmentation, and part-of-speech tagging on the text information; and that the electronic device obtains second personal data from the first personal data specifically includes: The electronic device obtains a word that belongs to a preset part of speech from the text information. In this way, the electronic device removes data that cannot represent the behavioral characteristic of the user from the first personal data. The electronic device removes useless data, so that the obtained second personal data can better describe the behavioral characteristic of the user, and the constructed personal knowledge graph can more accurately represent the behavioral characteristic of the user.

With reference to the first aspect, in a possible implementation of the first aspect, after the electronic device obtains the word that belongs to the preset part of speech from the text information, the method further includes: The electronic device obtains a word that appears once in the text information; and if two or more same words appear in the text information, the electronic device obtains one of the two or more same words that appear in the text information, to obtain the second person data. In this way, the electronic device removes repeated data, to reduce data redundancy.

With reference to the first aspect, in a possible implementation of the first aspect, the personal information of the user includes one or more of the following: a gender, an age, a personality, a hobby, an interpersonal relationship, income, contacts information, a call record, a short message service message, memo information, a residence address, and a weather condition at the residence address.

With reference to the first aspect, in a possible implementation of the first aspect, that the electronic device displays the second advertisement content in an advertisement display area of a display specifically includes: The electronic device plays the one or more advertisements in the second advertisement content in descending order of predicted preference values of the user in the second advertisement content; the electronic device plays an advertisement that corresponds to a largest predicted preference value of the user in the second advertisement content; or the electronic device plays the one or more advertisements in the to-be-placed advertisement in descending order of predicted preference values of the user in the second advertisement content, and blocks one or more advertisements played by the electronic device in a first time period in the second advertisement content. In this way, the electronic device plays the one or more advertisements in the second advertisement content in descending order of the predicted preference values of the user, or plays the advertisement that corresponds to the largest predicted preference value of the user, to better meet a preference of the user. Therefore, there is a higher possibility that the user views the advertisement. In addition, the electronic device blocks the one or more advertisements played by the electronic device in the first time period, to avoid a case in which user experience is affected because a same advertisement is repeatedly recommended in a short time period.

With reference to the first aspect, in a possible implementation of the first aspect, after the electronic device displays the second advertisement content in the advertisement display area of the display, the method further includes: The electronic device obtains viewing data of the user for the second advertisement content, where the viewing data includes advertisement types of one or more advertisements viewed by the user in the second advertisement content and advertisement types of one or more advertisements closed by the user in the second advertisement content; and the electronic device updates the first model based on the viewing data. In this way, the electronic device updates the first model based on the data of viewing an advertisement by the user, so that the first model recommends an advertisement of a type viewed by the user for a largest quantity of times to the user when recommending an advertisement to the user next time, to better meet a requirement of the user.

According to a second aspect, this application provides an electronic device. The electronic device includes one or more processors, one or more memories, and a display. The one or more memories and the display are coupled to the one or more processors. The one or more memories are configured to store computer program code. The computer program code includes computer instructions. The one or more processors invoke the computer instructions, so that the electronic device performs the advertisement display method provided in any one of the first aspect and the implementations of the first aspect.

According to a third aspect, this application provides a computer storage medium. The computer-readable storage medium stores a computer program. When the computer program is executed by a processor, the processor performs the advertisement display method provided in any one of the first aspect and the implementations of the first aspect.

According to a fourth aspect, an embodiment of this application provides a computer program product. A computer-readable storage medium stores a computer program. When the computer program is executed by a processor, the processor performs the advertisement display method provided in any one of the first aspect and the implementations of the first aspect.

In the method, the electronic device constructs the personal knowledge graph of the user by using the obtained personal data, and trains the re-ranking model based on the personal knowledge graph; after the electronic device sends the advertisement recommendation request to the advertisement server, the electronic device receives the parameter information of the first advertisement content sent by the advertisement server; then the electronic device further screens the parameter information of the first advertisement content based on the re-ranking model, to obtain the parameter information of the second advertisement content; and the electronic device obtains the second advertisement content based on the parameter information of the second advertisement content, and recommends the second advertisement content to the user for viewing.

The method implements an advertisement recommendation solution in which a terminal side and a server side cooperate with each other. In this way, an advertisement placement effect of an advertisement provider is optimized, so that advertisement placement by the advertisement provider is more accurate, to increase economic benefits of the advertisement provider. In addition, the personal knowledge graph of the user is constructed by using the personal data stored on the terminal side, and therefore the personal knowledge graph of the user can comprehensively describe a behavioral characteristic of the user, and the personal knowledge graph of the user is constructed on the terminal side, and therefore security of private information of the user is protected.

DETAILED DESCRIPTION OF ILLUSTRATIVE EMBODIMENTS

Figure 1:
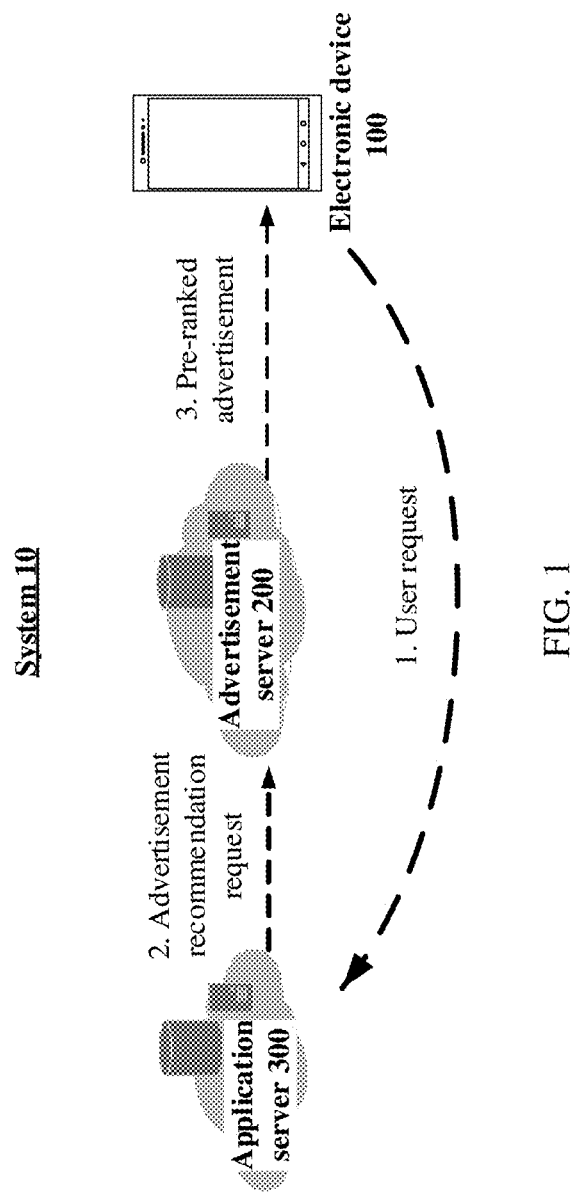
FIG. 1 is a schematic diagram of an advertisement recommendation system according to an embodiment of this application.

The technical solutions in embodiments of this application are clearly and completely described below with reference to the accompanying drawings. In the description of embodiments of this application, "/" means "or" unless otherwise specified. For example, A/B may represent A or B. In this specification, "or" describes only an association relationship between associated objects, and represents that three relationships may exist. For example, A or B may represent the following three cases: Only A exists, both A and B exist, and only B exists. In addition, in the description of embodiments of this application, "a plurality of" means two or more.

The terms "first" and "second" in the following are merely intended for a purpose of description, and should not be understood as an indication or implication of relative importance or an implicit indication of a quantity of indicated technical features. Therefore, a feature limited by "first" or "second" may explicitly or implicitly include one or more features. In the description of embodiments of this application, unless otherwise specified, "a plurality of" means two or more.

A term "user interface (user interface, UI)" in this specification, claims, and accompanying drawings of this application is a medium interface for interaction and information exchange between an application or an operating system and a user, and implements conversion between an internal form of information and a form acceptable to the user. A user interface of an application is source code written in a specific computer language, for example, Java or an extensible markup language (extensible markup language, XML). The interface source code is parsed and rendered on a terminal device, and is finally presented as content that can be recognized by a user, for example, a control such as a picture, text, or a button. A control (control) is also referred to as a widget (widget), and is a basic element of a user interface. Typical controls include a toolbar (toolbar), a menu bar (menu bar), a text box (text box), a button (button), a scrollbar (scrollbar), a picture, and text. An attribute and content of a control in the interface are defined by using a tag or a node. For example, the control included in the interface is defined in the XML by using a node, for example, <Textview>, <ImgView>, or <VideoView>. One node corresponds to one control or one attribute in the interface. After being parsed and rendered, the node is presented as content visible to a user. In addition, interfaces of many applications such as a hybrid application (hybrid application) usually further include a web page. A web page, also referred to as a page, may be understood as a special control embedded in an interface of an application. The web page is source code written in a specific computer language, for example, a hypertext markup language (hypertext markup language, HTML), cascading style sheets (cascading style sheets, CSS), or JavaScript (JavaScript, JS). The web page source code may be loaded and displayed as content that can be recognized by a user by a browser or a web page display component that has a function similar to a function of a browser. Specific content included on the web page is defined by using a tag or a node in the web page source code. For example, an element and an attribute of the web page are defined in the HTML by using <p>, <img>, <video>, or <canvas>.

A user interface is usually represented in a form of a graphical user interface (graphical user interface, GUI), and is a user interface that is related to a computer operation and that is graphically displayed. The user interface may be an interface element such as an icon, a window, or a control displayed on a display of an electronic device. The control may include a visual interface element such as an icon, a button, a menu, a tab, a text box, a dialog box, a status bar, a navigation bar, or a widget.

For ease of understanding this application, terms in this application are explained below.

File system: The file system is used to store unstructured personal data generated in a running process of each application in an electronic device. The unstructured personal data is data that cannot be represented by using a two-dimensional logic table. The unstructured personal data may be data such as a document, a picture, a video, or text. For example, the unstructured personal data may be data generated in a running process of a camera application. A picture and a video captured by the camera application are stored in the file system. Therefore, the picture and the video captured by the camera application are unstructured personal data.

Data service: The data service is used to store structured personal data generated in a running process of each application in an electronic device. The structured personal data is data that can be represented by using a uniform structure. For example, the structured personal data may be data generated in a running process of a contacts application. For example, in the data service, a user contact name and a user contact phone number stored in the contacts application are stored in a one-to-one correspondence. The user contact name and the user contact phone number are structured personal data.

Personal data: The personal data includes personal privacy-related data.

Specifically, the personal data may be personal privacy-related data generated in a process in which an electronic device runs each application, and the data generated in the process of each application is stored in a file system and/or a data service. The personal data may further be personal privacy-related data that is directly obtained by the electronic device from each application after obtaining authorization from a user, for example, a communication application, a messaging application, a contacts application, a memo application, a weather application, or a shopping application.

The data generated in the running process of each application in the electronic device is stored in the data service and/or the file system, and the electronic device may obtain the personal data of the user from the data service and/or the file system.

In addition, the application in the electronic device may obtain authorization from the user, and after obtaining authorization from the user, the electronic device may obtain the personal data of the user from each application. It should be noted that the personal data of the user directly obtained by the electronic device from the application may be classified into structured personal data and unstructured personal data.

Group data: The group data includes data that is of a plurality of users in a user group and that is not related to user privacy, for example, service data generated when the user views an advertisement. For example, one or more of the following may be included: an advertisement frequently tapped by the user, an advertisement never tapped by the user, duration of viewing an advertisement by the user, and an advertisement closed by the user.

Personal knowledge graph: The personal knowledge graph is a data structure that is constructed based on personal data of a user and that graphically displays an association between the personal data.

Personal data of different users is different, and therefore personal knowledge graphs of the different users are different.

Currently, a group knowledge graph is constructed based on group data of a user group, that is, the knowledge graph is a data structure that represents an association between the group data of the user group. The group knowledge graph cannot represent a behavioral characteristic of an individual user.

In this application, an electronic device may construct a personal knowledge graph of each user based on personal data of the user. For a specific process of constructing the personal knowledge graph, refer to detailed description in subsequent method embodiments. Details are not described herein.

Group profile: The group profile is a label generated based on group data for a user group.

The label of the user group may include but is not limited to a type of an advertisement that the user group likes to browse, a type of an advertisement ignored by the user group for a largest quantity of times, a type of an advertisement closed by the user group for a largest quantity of times, or a type of an advertisement reported by the user group for a largest quantity of times.

In some embodiments, the user group is a set of all users regardless of gender, age, and area.

In some embodiments, user groups may be classified based on a gender. For example, the user groups may be classified into a female user group and a male user group. Alternatively, the user groups may be classified into user groups of various age groups, or the like.

For example, when the user groups are classified into a female user group and a male user group, group profiles may be classified into a female user group profile and a male user group profile. Specifically, the group data may be classified into data of the male user group and data of the female user group. The male user group is profiled based on the data of the male user group, that is, the male user group is labeled. For example, the male user group is most interested in a vehicle advertisement, and is not interested in a makeup advertisement. The female user group is profiled based on the data of the female user group, that is, the female user group is labeled. For example, the female user group is interested in a clothing advertisement and a makeup advertisement, and is not interested in a sports advertisement.

For example, when the user groups are classified into user groups of various age groups, the user groups of various age groups may be profiled based on the user groups. Specifically, the group data may be classified based on an age group. For example, data of a user group of users aged between 0 and 20 is classified into one type, data of a user group of users aged between 21 and 35 is classified into one type, data of a user group of users aged between 36 and 50 is classified into one type, and data of a user group of users aged between 51 and 70 is classified into one type. The user groups of various age groups are respectively profiled based on data of the user groups of various age groups, that is, the user groups of various age groups are labeled. For example, the user group aged between 0 and 20 is most interested in a toy advertisement, the user group aged between 21 and 35 is most interested in an electronic product advertisement, the user group aged between 36 and 50 is most interested in a skin care and hair care advertisement, and the user group aged between 51 and 70 is most interested in a health care advertisement.

Advertisement: The advertisement is a means of spreading information to the public. Advertisements may be classified into a public service advertisement and a for-profit advertisement. The public service advertisement is a non-profit advertising activity that provides free services to the society. The for-profit advertisement may include promotion of various applications, products, or some brands. For example, the for-profit advertisement may be a makeup advertisement, a food advertisement, a music preview recommendation advertisement, a video recommendation advertisement, a novel recommendation advertisement, a movie recommendation advertisement, or an application download recommendation advertisement.

Currently, an advertisement placement procedure may include the following steps:

An advertisement server first receives an advertisement recommendation request sent by an application server, and in response to the advertisement recommendation request, the advertisement server sends an advertisement obtaining request to a vendor server (for example, a mobile phone vendor server).

A function of the advertisement server is to obtain advertisements from vendors and screen the advertisements, and then the advertisement server sends an advertisement obtained through screening to each application for display.

There may be a plurality of vendor servers, for example, the mobile phone vendor server, a vehicle vendor server, and a makeup brand vendor server. The plurality of vendor servers receive the advertisement obtaining request sent by the advertisement server, and when any one of the plurality of vendor servers has a to-be-sent advertisement, the any vendor server may send the to-be-sent advertisement to the advertisement server.

The advertisement server receives advertisements sent by any vendor server, and the advertisement server screens the plurality of advertisements (for example, screens the advertisements in descending order of prices of the advertisements), to obtain an advertisement set.

In some embodiments, the advertisements sent by the any vendor server to the advertisement server may include a repeated advertisement, and the advertisement server may further deduplicate the obtained advertisements to avoid a repeated advertisement.

The advertisement server further screens advertisements in the advertisement set based on group data of a user group, to obtain an advertisement list. The advertisement server sends the advertisement list to the application, and the application displays an advertisement in the advertisement list.

Pre-ranked advertisement: The pre-ranked advertisement is a set of one or more advertisements. The pre-ranked advertisement is obtained by an advertisement server by screening a large quantity of advertisements based on a degree of interest of a user group in the advertisement.

To-be-placed advertisement: The to-be-placed advertisement is a set of one or more advertisements, and is obtained by an electronic device by screening pre-ranked advertisements based on personal data of a user and a probability that the user may tap an advertisement. A quantity of to-be-placed advertisements may be the same as a quantity of pre-ranked advertisements. Alternatively, a quantity of to-be-placed advertisements may be less than a quantity of pre-ranked advertisements. This is because the electronic device may filter out some advertisements from the pre-ranked advertisements based on the personal data of the user.

For ease of understanding this application, an advertisement recommendation system is described below.

FIG. 1 is a schematic diagram of an advertisement recommendation system. The system 10 may include an electronic device 100, an advertisement server 200, and an application server 300 shown in FIG. 1.

The electronic device 100 may be configured to detect a user operation, and in response to the user operation, the electronic device 100 sends a user request to the application server 300.

For example, the user operation may be that the electronic device 100 detects that a user starts an application or the electronic device 100 detects that a user slides to a current browsing interface of a next video in an application (for example, the electronic device 100 detects that the user slides down to the current browsing interface of the next video with a single finger). In this case, the electronic device 100 sends the user request to the application server 300.

The application server 300 may be configured to receive and respond to the user request, and the application server 300 sends an advertisement recommendation request to the advertisement server 200.

The advertisement server 200 may be configured to screen advertisements in an advertisement set based on a group profile of the user, to obtain a pre-ranked advertisement.

The advertisement server 200 may be further configured to send the pre-ranked advertisement to the electronic device 100.

The electronic device 100 may be further configured to: receive the pre-ranked advertisement sent by the advertisement server 200, and further screen the pre-ranked advertisement, to obtain a to-be-placed advertisement. Then, the electronic device 100 recommends the to-be-placed advertisement to the user for viewing.

It should be noted that the advertisement recommendation system architecture in FIG. 1 is merely an example implementation in embodiments of this application, and an advertisement recommendation system architecture in embodiments of this application includes but is not limited to the foregoing advertisement recommendation system architecture.

Currently, there are usually two advertisement placement manners. Manner 1: An application server collects service data of viewing an advertisement by a plurality of users, and uploads the service data of the user group to an advertisement server. The advertisement server screens a plurality of advertisements based on the service data of the user group, to obtain a list of advertisements that the user group is interested in. The advertisement server sends the advertisement that the user group is interested in to the user. In this advertisement placement manner, an advertisement is recommended by using the service data of the user group. In this advertisement push manner, differences between individual users are not considered, and there is a recommendation homogeneity problem. Manner 2: An application server collects search information and browsing information of an individual user, and the application server extracts a keyword in the search information and the browsing information to recommend content to the individual user. For example, the individual user searches a shopping application for an item (for example, a headset) that the individual user wants to buy, and when the individual user uses the shopping application next time, the shopping application recommends a plurality of types of headset item information to the individual user. In this recommendation manner, the search information and the browsing information of the user are collected, and for the user, personal privacy of the user is disclosed.

To resolve the foregoing problem, the following embodiments of this application provide an advertisement display method. In the method, an electronic device may receive a user operation. In response to the user operation, the electronic device sends a user request to an application server, the application server sends an advertisement recommendation request to an advertisement server, and the electronic device receives a pre-ranked advertisement (first advertisement content) returned by the advertisement server. Then, the electronic device further screens the pre-ranked advertisement, to obtain a to-be-placed advertisement (second advertisement content). There may be one or more pre-ranked advertisements and one or more to-be-placed advertisements.

In some embodiments, the electronic device may directly receive a pre-ranked advertisement (first advertisement content) returned by an advertisement server. Then, the electronic device further screens the pre-ranked advertisement, to obtain a to-be-placed advertisement (second advertisement content). The electronic device does not need to send the user request to the application server. This is not limited herein in this application.

Specifically, the electronic device constructs a personal knowledge graph of a user by using obtained personal data, and trains a re-ranking model based on the personal knowledge graph; after the application server sends the advertisement recommendation request to the advertisement server, the electronic device receives the pre-ranked advertisement sent by the advertisement server; then the electronic device further screens the pre-ranked advertisement based on the re-ranking model, to obtain the to-be-placed advertisement; and the electronic device recommends the to-be-placed advertisement to the user for viewing.

In some embodiments, the electronic device may receive parameter information of the first advertisement content from the advertisement server. The parameter information may be information such as a type, a link address, and a size of the first advertisement content. The electronic device obtains parameter information of the second advertisement content from the parameter information of the first advertisement content based on the personal knowledge graph. The electronic device obtains the second advertisement content from the advertisement server based on the parameter information of the second advertisement content. This is not limited herein in this application.

The method implements an advertisement recommendation solution in which a terminal side and a server side cooperate with each other. In this way, an advertisement placement effect of an advertisement provider is optimized, so that advertisement placement by the advertisement provider is more accurate, to increase economic benefits of the advertisement provider. In addition, the personal knowledge graph of the user is constructed by using the personal data stored on the terminal side, and therefore the personal knowledge graph of the user can comprehensively describe a behavioral characteristic of the user, and the personal knowledge graph of the user is constructed on the terminal side, and therefore security of private information of the user is protected.

A hardware architecture of an electronic device in embodiments of this application is described below.

Figure 2:
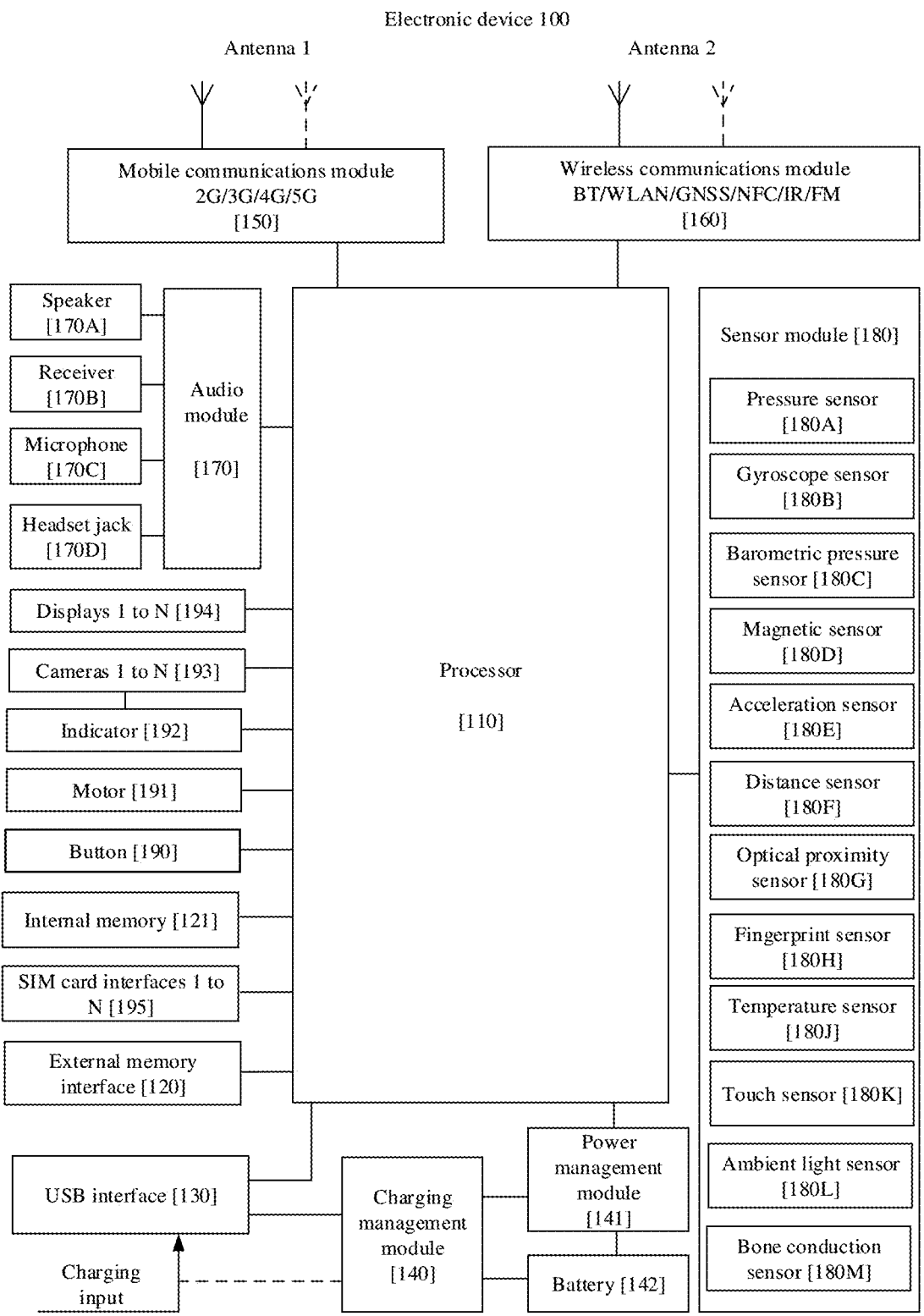
FIG. 2 is a schematic diagram of a structure of an electronic device 100 according to an embodiment of this application.

FIG. 2 is a schematic diagram of a structure of an electronic device 100.

This embodiment is described below in detail by using the electronic device 100 as an example. A device type of the electronic device 100 may include a mobile phone, a television, a tablet computer, a sound box, a watch, a desktop computer, a laptop computer, a handheld computer, a notebook computer, an ultra-mobile personal computer (ultra-mobile personal computer, UMPC), a netbook, a personal digital assistant (personal digital assistant, PDA), an augmented reality (augmented reality, AR) device/a virtual reality (virtual reality, VR) device, or the like. The device type of the electronic device 100 is not specially limited in this embodiment of this application.

It should be understood that the electronic device 100 shown in FIG. 2 is merely an example, and the electronic device 100 may include more or fewer components than those shown in FIG. 2, two or more components may be combined, or there may be different component configurations. Components shown in the figure may be implemented by hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, some components may be combined, some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. Therefore, repeated access is avoided, and a waiting time of the processor 110 is reduced, and therefore system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, or the like.

The charging management module 140 is configured to receive a charging input from a charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to be connected to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed, to improve antenna utilization.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal obtained after modulation by the modem processor, and convert the signal into an electromagnetic wave for radiation through the antenna 1.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more devices into which at least one communication processing module is integrated. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The electronic device 100 implements a display function by using the GPU, the display 194, the application processor, and the like. The display 194 is configured to display an image, a video, and the like. The display 194 includes a display panel.

The electronic device 100 may implement a photographing function by using the ISP, the camera 193, the video codec, the GPU, the display 194, the application processor and the like.

In some embodiments, the wireless communication solution provided by the mobile communications module 150 may enable the electronic device to communicate with a device (for example, an advertisement server) in a network, and the WLAN wireless communication solution provided by the wireless communications module 160 may also enable the electronic device to communicate with a device (for example, the advertisement server) in the network.

In some embodiments, the electronic device 100 may send, by using the wireless communications module 160, an advertisement recommendation request to establish a communication connection to the advertisement server, the electronic device 100 may further receive, by using the wireless communications module 160, a pre-ranked advertisement sent by the advertisement server, the electronic device 100 may further screen the pre-ranked advertisement by using the processor 110, to obtain a to-be-placed advertisement, and the electronic device 100 may be further configured to display the to-be-placed advertisement to the user by using the display 194 for viewing.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image.

The camera 193 is configured to capture a static image or a video. An optical image of an object is generated through the lens, and is projected onto the photosensitive element.

The digital signal processor is configured to process a digital signal, and may process another digital signal in addition to the digital image signal.

The NPU is a neural-network (neural-network, NN) computing processor, quickly processes input information by referring to a structure of a biological neural network, for example, by referring to a mode of transmission between human brain neurons, and may further continuously perform self-learning.

The external memory interface 120 may be configured to be connected to an external storage card, for example, a micro SD card, to extend a storage capability of the electronic device 100.

The internal memory 121 may be configured to store computer-executable program code. The executable program code includes instructions. The processor 110 performs various functional applications and data processing of the electronic device 100 by running the instructions stored in the internal memory 121.

The electronic device 100 may implement an audio function, for example, music play and recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The audio module 170 may be further configured to encode and decode an audio signal.

The speaker 170A, also referred to as a "loudspeaker", is configured to convert an audio electrical signal into a sound signal. The electronic device 100 may be used to listen to music or answer a hands-free call through the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending speech information, a user may place the mouth of the user near the microphone 170C to make a sound, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

In this embodiment, the electronic device 100 collects a sound signal by using the microphone 170C, and transmits the sound signal to an application in the electronic device 100.

The headset jack 170D is configured to be connected to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a messaging icon, an instruction for viewing a short message service message is executed. When a touch operation whose touch operation intensity is greater than or equal to the first pressure threshold is performed on the messaging icon, an instruction for creating a new short message service message is executed.

The gyroscope sensor 180B may be configured to determine a motion posture of the electronic device 100. In some embodiments, angular velocities of the electronic device 100 around three axes (namely, an x axis, a y axis, and a z axis) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse movement, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude by using a value of the barometric pressure measured by the barometric pressure sensor 180C, to assist in positioning and navigation.

The magnetic sensor 180D includes a Hall sensor. The electronic device 100 may detect opening and closing of a flip holster by using the magnetic sensor 180D. In some embodiments, when the electronic device 100 is a flip phone, the electronic device 100 may detect opening and closing of a flip cover based on the magnetic sensor 180D. Further, a feature such as automatic unlocking upon opening of the flip cover is set based on a detected opening or closing state of the holster or the flip cover.

The acceleration sensor 180E may detect magnitudes of acceleration of the electronic device 100 in various directions (usually on three axes), may detect a magnitude and a direction of gravity when the electronic device 100 is still, and may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the distance sensor 180F, to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for making a call, to automatically turn off a screen for power saving. The optical proximity sensor 180G may also be used in a holster mode and a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may be further configured to automatically adjust white balance during photographing. The ambient light sensor 180L may further cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 18J. For example, when the temperature reported by the temperature sensor 180J exceeds a threshold, the electronic device 100 lowers performance of a processor located near the temperature sensor 180J, to reduce power consumption and implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused due to a low temperature.

The touch sensor 180K may also be referred to as a touch panel or a touch-sensitive surface. The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may be in contact with a human pulse, to receive a blood pressure beating signal. In some embodiments, the bone conduction sensor 180M may alternatively be disposed in a headset to be combined into a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to provide an incoming call vibration prompt and touch vibration feedback. For example, touch operations performed on different applications (for example, photographing and audio play) may correspond to different vibration feedback effects. The motor 191 may correspond to different vibration feedback effects for touch operations performed on different areas of the display 194. Different application scenarios (for example, a time reminder, message receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to be connected to a SIM card. The SIM card may be inserted into the SIM card interface 195 or removed from the SIM card interface 195, to come into contact with and be separated from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of this application, a software structure of the electronic device 100 is described by using the layered architecture.

Figure 3:
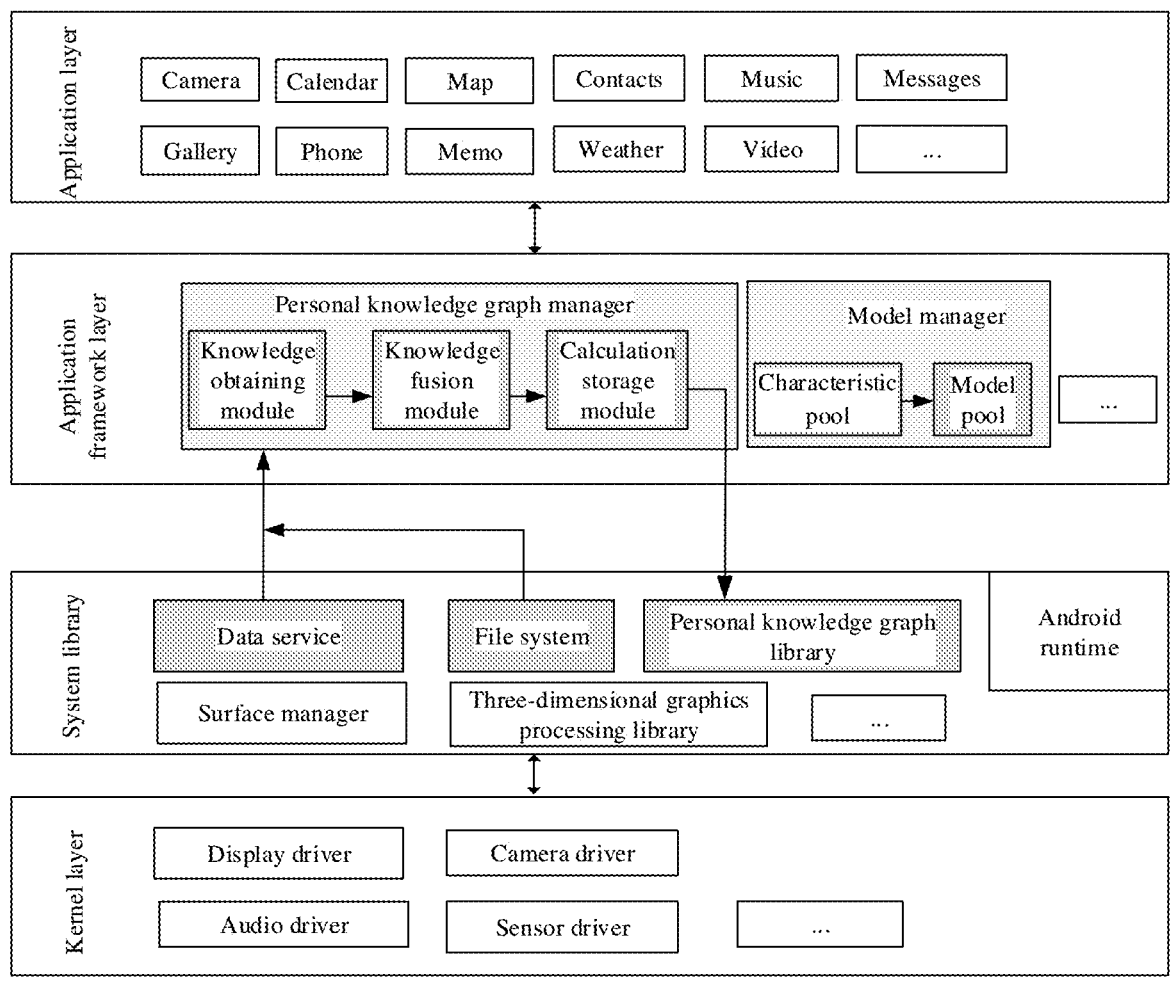
FIG. 3 is a block diagram of a software structure of an electronic device 100 according to an embodiment of this application.

FIG. 3 is a block diagram of a software structure of an electronic device 100 according to an embodiment of this application.

In a layered architecture, a software system is divided into several layers, and each layer has a clear role and task. The layers communicate with each other through a software interface. In some embodiments, in the layered architecture, the system is divided into four layers: an application layer, an application framework layer, an Android runtime (Android runtime) and system library, and a kernel layer from top to bottom.

The application layer may include a series of application packages.

As shown in FIG. 3, the application package may include applications such as Camera, Gallery, Calendar, Phone, Map, Memo, Contacts, Weather, Music, Video, and Messages.

The application framework layer provides an application programming interface (application programming interface, API) and a programming framework for an application at the application layer. The application framework layer includes some predefined functions.

As shown in FIG. 3, the application framework layer may include a personal knowledge graph manager, a model manager, and the like.

The personal knowledge graph manager is configured to construct a personal knowledge graph of a user. The personal knowledge graph manager includes a knowledge obtaining module, a knowledge fusion module, and a calculation storage module.

The knowledge obtaining module is configured to obtain personal data. The knowledge obtaining module may obtain the personal data of the user from two aspects.

Data generated in a running process of each application in the electronic device is stored in a data service and/or a file system, and the knowledge obtaining module may obtain the personal data of the user from the data service and/or the file system.

In addition, the application in the electronic device may obtain authorization from the user, and after obtaining authorization from the user, the electronic device may obtain the personal data of the user from each application.

Then, the knowledge obtaining module sends the personal data to the knowledge fusion module.

The knowledge fusion module is configured to: receive the personal data sent by the knowledge obtaining module, preprocess the personal data, and classify preprocessed personal data by relationship, event, and entity based on a machine learning algorithm, to obtain three types of knowledge, namely, relationship knowledge, event knowledge, and entity knowledge, of the user.

User knowledge includes the relationship knowledge, the event knowledge, and the entity knowledge.

The relationship knowledge is user knowledge that is obtained based on the personal data and that is about an interpersonal relationship such as a friend relationship, a colleague relationship, or a family relationship.

The event knowledge is user knowledge that is obtained based on the personal data and that is about a thing that occurs, a thing that is being done, or a thing that does not occur, for example, traveling, going on a business trip, or doing exercise.

The entity knowledge is user knowledge that is obtained based on the personal data and that is about an entity such as a movie or music that the user likes.

It may be learned from the foregoing embodiment that the personal data obtained by the knowledge obtaining module may be classified into structured personal data and unstructured personal data.

The knowledge fusion module may preprocess the unstructured personal data (for example, audio, a video, and a picture). The preprocessing includes converting information included in the unstructured personal data (for example, audio, a video, and a picture) into text information, and then cleansing the text information. The cleansing the text information includes performing word segmentation and part-of-speech tagging on the text information through natural language processing, and deleting a word that does not belong to a preset part of speech from the text information based on the preset part of speech, for example, deleting an article, a preposition, an adverb, a conjunction, a verb, or a modal particle. The preset part of speech may be customized by the user, and the preset part of speech may be set based on an actual requirement.

Then, the knowledge fusion module deduplicates cleansed text information. Deduplication is performed because the personal data of the user obtained by the electronic device 100 from the data service and/or the file system and the personal data of the user directly obtained from each application include repeated data, and when the electronic device 100 directly obtains the personal data of the user from each application, the personal data in each application may also include repeated data. Therefore, the knowledge fusion module deduplicates the cleansed text information to delete repeated data, to reduce data redundancy.

For part-of-speech tagging, refer to Table 1.

TABLE 1

| Marker | Part of speech | Marker | Part of speech | Marker | Part of speech |
|---|---|---|---|---|---|
| a | Adjective | b | Distinguishing word | c | Conjunction |
| d | Adverb | e | Interjection | f | Noun of locality |
| g | Morpheme | h | Prefix | i | Idiom |
| j | Abbreviation | k | Suffix | l | Habitual expression |
| m | Numeral | n | Noun | o | Onomatopoeic word |
| p | Preposition | q | Quantifier | r | Pronoun |
| s | Location word | t | Time word | u | Auxiliary word |
| v | Verb | w | Punctuation mark | x | Non-morpheme word |
| y | Modal particle | z | Descriptive word | nr | Personal name |
| ns | Place name | nt | Organization name | nz | Other proper nouns |

Part-of-speech tagging may be performed, based on Table 1, on words obtained after word segmentation is performed on the text information. Specifically, "/a" is added after an adjective, "/b" is added after a distinguishing word, "/c" is added after a conjunction, "/d" is added after an adverb, "/e" is added after an interjection, "/f" is added after a noun of locality, "/g" is added after a morpheme, "/h" is added after a prefix, "/i" is added after an idiom, "/j" is added after an abbreviation, "/k" is added after a suffix, "/l" is added after a habitual expression, "/m" is added after a numeral, "/n" is added after a noun, "/o" is added after an onomatopoeic word, "/p" is added after a preposition, "/q" is added after a quantifier, "/r" is added after a pronoun, "/s" is added after a location word, "/t" is added after a time word, "/u" is added after an auxiliary word, "/v" is added after a verb, "/w" is added after a punctuation mark, "/x" is added after a non-morpheme word, "/y" is added after a modal particle, "/z" is added after a descriptive word, "/nr" is added after a personal name, "/ns" is added after a place name, "/nt" is added after an organization name, and "nz" is added after other proper nouns.

For example, for text information "the television series 1 is starred by an actor 1, and premiered in Apple Video on May 4, 2020", a result obtained after word segmentation and part-of-speech tagging are performed on the text data is "the television series 1/n is/v starred/v by/p an actor 1/nr, and/c premiered/v in/p Apple/n Video/n on/p May/m 4/m, 2020/m./w".

Only some example rules for part-of-speech tagging are listed in Table 1. There may further be more rules for part-of-speech tagging, and part-of-speech tagging may be performed with reference to another rule. This is not limited herein in this application.

The knowledge fusion module may preprocess the structured personal data. The preprocessing includes two steps: data cleansing and deduplication. Manners of cleansing and deduplicating the structured personal data are the same as the manners o cleansing and deduplicating the unstructured personal data. Details are not described herein.

The cleansed and deduplicated personal data is input to a machine learning algorithm, and the machine learning algorithm is used to classify preprocessed personal data by relationship knowledge, event knowledge, and entity knowledge.

The machine learning algorithm may be an association rule-based clustering algorithm. An association rule may be preset based on an actual requirement, and then cluster analysis processing is performed on the preprocessed personal data based on the preset association rule, to extract core information (the relationship knowledge, the event knowledge, and the entity knowledge) from the preprocessed personal data. In this method, the core information (the relationship knowledge, the event knowledge, and the entity knowledge) related to the constructed knowledge graph can be more accurately extracted from the preprocessed personal data.

In addition, core information that is not related to the constructed knowledge graph in the preprocessed personal data (second person data) is collectively referred to as basic characteristic data of the user. The basic characteristic data of the user may include a gender and an age of the user, information (for example, a device identifier and a device model) about a device used by the user, and the like.

In addition to the association rule-based clustering algorithm, the machine learning algorithm may be a decision tree classification method, a naive Bayes classification algorithm, a support vector machine-based classification method, or the like. This is not limited herein in this application.

The knowledge fusion module is further configured to send the relationship knowledge, the entity knowledge, and the event knowledge to the calculation storage module.

The calculation storage module is configured to: receive the user knowledge sent by the knowledge fusion module, and store the user knowledge based on a predetermined structure. For example, the user knowledge may be stored based on a 5-tuple structure.

Specifically, the calculation storage module may store the relationship knowledge based on the predetermined structure. The relationship knowledge is stored based on the predetermined structure, so that the relationship knowledge and time are correspondingly stored, to reflect an association between the relationship knowledge and the time. For example, the relationship knowledge and the time may be stored based on a 5-tuple structure (a first 5-tuple structure), and the 5-tuple structure is "entity 1-relationship-entity 2-time point-time interval".

For example, the relationship knowledge is "I-customer-Mr. Wang-2019.6.8-14". The relationship knowledge means that I and the customer Mr. Wang met on Jun. 8, 2019 and have known each other for 16 months up to now (for example, Aug. 10, 20202).

The calculation storage module may store the event knowledge based on the predetermined structure. The event knowledge is stored based on the predetermined structure, so that the event knowledge and time are correspondingly stored, to reflect an association between the event knowledge and the time. For example, the event knowledge and the time may be stored based on a 5-tuple structure (a second 5-tuple structure), and the 5-tuple structure is "event-argument-logical relationship-time point-time interval". Herein, the argument is an action that supports the event, and the logical relationship may be a causal relationship, a sequential relationship, or the like.

For example, the event knowledge is "go on a business trip-buy an air ticket-sequential-2020.9.1-3 days". The event knowledge expresses the event of going on a business trip, there is a sequential relationship between going on a business trip and buying an air ticket, a departure date is Sep. 1, 2020, and a schedule is 3 days.

The calculation storage module may store the entity knowledge based on the predetermined structure. The entity knowledge is stored based on the predetermined structure, so that the entity knowledge and time are correspondingly stored, to reflect an association between the entity knowledge and the time. For example, the entity knowledge and the time may be stored based on a 5-tuple structure (a third 5-tuple structure), and the 5-tuple structure is "entity 1: time-association weight-entity 2-relationship weight-entity 3".

For example, the entity knowledge is "television series 1: 2020.4.6-1.0-actor 1-0.8-actor 3". The entity knowledge indicates that the television series 1 is released on Apr. 6, 2020, a degree of association between the television series 1 and the actor 1 is 1.0, and a degree of association between the actor 1 and the actor 3 is 0.8. This indicates that there is a higher degree of association between the television series 1 and the actor 1.

Figure 8:
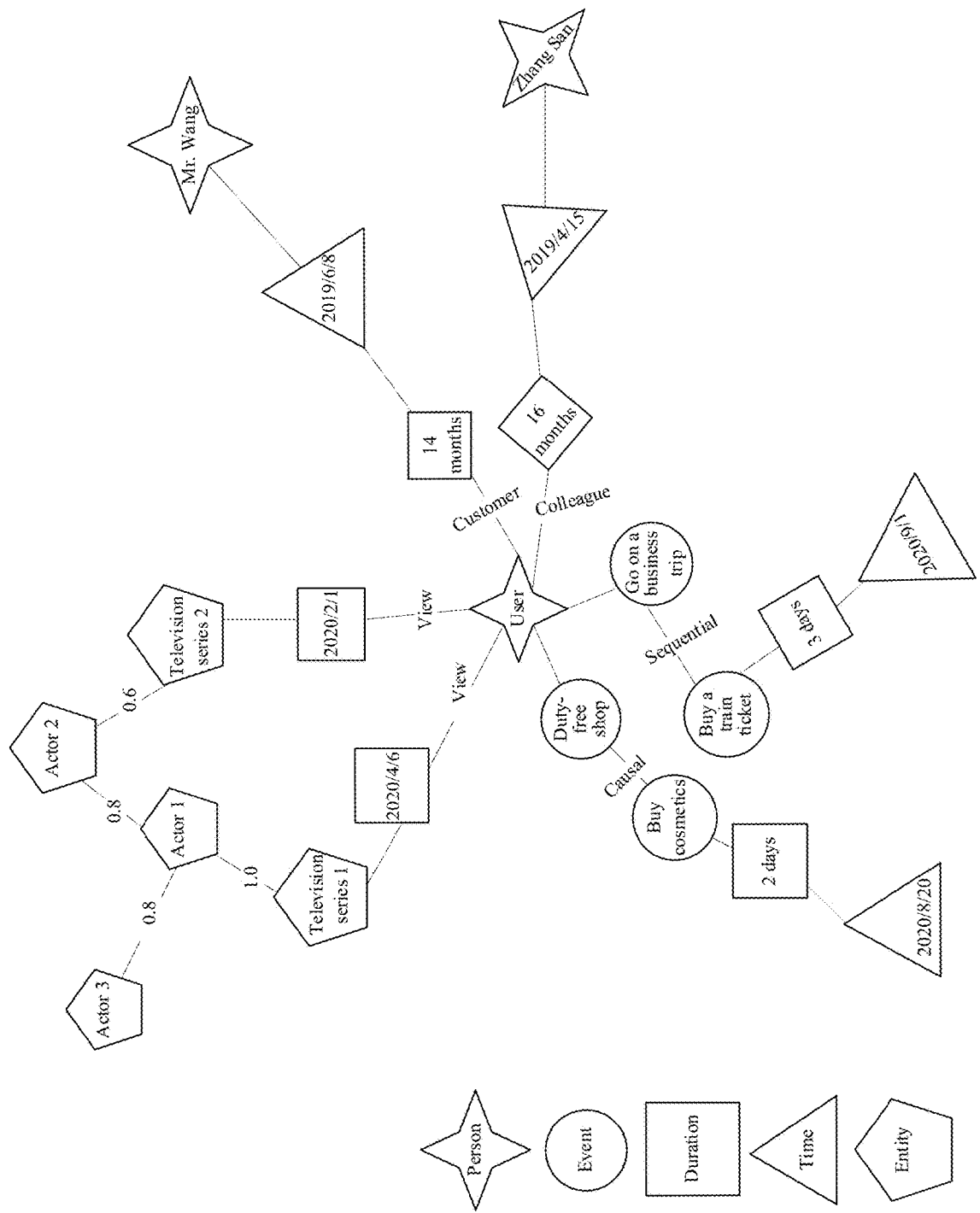
FIG. 8 is a schematic diagram of graphically representing a constructed personal knowledge graph according to an embodiment of this application.

The calculation storage module is further configured to construct the personal knowledge graph based on the user knowledge of the predetermined structure. The personal knowledge graph graphically displays the user knowledge of the predetermined structure. Refer to a constructed personal knowledge graph that is graphically represented and that is shown in FIG. 8.

The calculation storage module is further configured to send the personal knowledge graph of the user to a personal knowledge graph library for storage.

The model manager includes a characteristic pool and a model pool. The characteristic pool is used to store the personal knowledge graph of the user and the basic characteristic data of the user. A re-ranking model is preset in the model pool. The re-ranking model may be an algorithm such as logistic regression, a decision tree, a factorization machine (Factorization Machine, FM), a field-aware factorization machine (Field-aware Factorization Machine, FFM), or deep learning. The model pool trains the re-ranking model based on the personal knowledge graph of the user and the basic characteristic data of the user. A trained re-ranking model (a first model) may further screen a pre-ranked advertisement, to obtain a to-be-placed advertisement.

How the model pool trains the re-ranking model is described below.

An input of training data of the re-ranking model is historical advertisement information, the basic characteristic data of the user, and the personal knowledge graph, and an output of the training data is a historical behavior of the user.

The re-ranking model may be but is not limited to an algorithm such as logistic regression, a decision tree, an FFM, or deep learning.

Historical advertisement information of a plurality of previously displayed advertisements is stored in the model pool, and the historical advertisement information may be information such as an advertisement ID, advertisement description, and an advertisement size.

The basic characteristic data of the user may include a gender and an age of the user, information (for example, a device identifier and a device model) about a device used by the user, and the like.

The historical behavior of the user may be an advertisement viewed by the user in a past week, duration of viewing an advertisement by the user, an advertisement closed by the user, and the like.

The input of the training data is input to the re-ranking model, and the re-ranking model outputs a result. The result may be that the user taps and browses an advertisement or that the user does not browse and closes an advertisement. The result is compared with the output of the training data. If the result does not match the output of the training data, a parameter of the re-ranking model is modified, and the re-ranking model continues to be trained. When the result that is output by the re-ranking model matches the historical behavior of the user, model training ends. After training of the re-ranking model is completed, the re-ranking model may predict a probability of tapping each advertisement in the pre-ranked advertisement, in other words, obtain a probability value of tapping each advertisement by the user, and the re-ranking model ranks advertisements in descending order of probability values of tapping the advertisements by the user, to obtain the to-be-placed advertisement.

For example, an interpersonal relationship network of the user may be obtained based on the relationship knowledge recorded in the personal knowledge graph of the user, and whether the user is a social person or an introvert person may be learned based on the interpersonal relationship network. A thing that the user frequently does may be obtained based on the event knowledge recorded in the personal knowledge graph of the user, for example, events such as traveling and going on a business trip. A television series that the user likes to view and the like may be obtained based on the entity knowledge recorded in the personal knowledge graph of the user.

For example, the re-ranking model learns, based on the personal knowledge graph of the user, that the user is a user who likes to view a movie and television series and occasionally goes on a business trip. The pre-ranked advertisement includes a ticket buying advertisement, a movie and television series advertisement, and a friend making advertisement. The re-ranking model predicts a probability for the pre-ranked advertisement, and obtains that a probability of tapping the ticket buying advertisement by the user is 0.5, a probability of tapping the movie and television series advertisement by the user is 0.9, and a probability of tapping the friend making advertisement by the user is 0.4. The re-ranking model re-ranks the pre-ranked advertisement based on the probability of tapping the advertisement by the user, to obtain the to-be-placed advertisement. An arrangement order of the to-be-placed advertisement is the movie and television series advertisement, the ticket buying advertisement, and the friend making advertisement.

The application obtains the re-ranking model, and the application may screen the pre-ranked advertisement based on the trained re-ranking model (the first model), to obtain the to-be-placed advertisement. The to-be-placed advertisement is obtained by screening the advertisements in the pre-ranked advertisement again based on the personal behavioral characteristics of the user, and the to-be-placed advertisement is obtained through ranking performed in descending order of the probabilities that the user may tap and view the advertisements.

How the application screens the pre-ranked advertisement to obtain the to-be-placed advertisement is described below.

In some embodiments, after the application obtains the pre-ranked advertisement, the application obtains the re-ranking model, and ranks, based on the re-ranking model, the pre-ranked advertisement in descending order of the probabilities that the user may tap and view the advertisements, to obtain the to-be-placed advertisement.

In some embodiments, after the application obtains the pre-ranked advertisement, the application obtains the re-ranking model, and the application may retain only an advertisement that corresponds to a highest probability of being tapped and viewed by the user.

In some other embodiments, after the application obtains the pre-ranked advertisement, the application obtains the re-ranking model, and the application may filter out an advertisement that corresponds to a probability that is of being tapped and viewed by the user and that is less than a threshold.

In some other embodiments, after the application obtains the pre-ranked advertisement, the application obtains the re-ranking model, and ranks, based on the re-ranking model, the pre-ranked advertisement in descending order of the probabilities that the user may tap and view the advertisements, and the application further determines whether each advertisement has been pushed within a specific time (for example, 3 days). If the application determines that some of the advertisements have been pushed within the specific time (for example, 3 days), the application filters out the advertisements that have been pushed within the specific time (for example, 3 days).

It should be noted that another manner may be used by the application to screen the pre-ranked advertisement to obtain the to-be-placed advertisement. This is not limited herein in this application.

The model manager at the application layer may provide an interface. An application server sends an advertisement recommendation request to an advertisement server. Then, the application receives a pre-ranked advertisement sent by the advertisement server. The application may obtain authorization from the user, and obtain the re-ranking model through the interface provided by the model manager. The application screens the pre-ranked advertisement by using the re-ranking model, to obtain a to-be-placed advertisement. The application recommends the obtained to-be-placed advertisement to the user for viewing.

In some embodiments, the personal knowledge graph library in the system library may provide an interface. After the application obtains authorization from the user, the application may obtain the personal knowledge graph of the user from the interface. The application may recommend content that the user is interested in to the user by using the personal knowledge graph of the user.

For example, a newly downloaded application has not recorded a behavior of the user, and the newly downloaded application may obtain authorization from the user to obtain the personal knowledge graph of the user. The newly downloaded application may recommend content that the user is interested in to the user by using the personal knowledge graph of the user. The user does not need to select the content that the user is interested in, and the newly downloaded application may perform personalized recommendation based on the personal knowledge graph. In addition, the newly downloaded application may perform personalized recommendation based on the personal knowledge graph, and the recommended content matches the behavioral characteristic of the user, and therefore a content recommendation effect is optimized.

The Android runtime includes a kernel library and a virtual machine. The Android runtime is responsible for scheduling and management of the system.

The kernel library includes two parts: a function that needs to be invoked in a Java language and a kernel library of the system.

The application layer and the application framework layer run on the virtual machine. The virtual machine executes Java files at the application layer and the application framework layer as binary files. The virtual machine is configured to perform functions such as object lifecycle management, stack management, thread management, security and exception management, and garbage collection.

The system library may include a plurality of functional modules, for example, the data service, the file system, the personal knowledge graph library, a surface manager (surface manager), and a three-dimensional graphics processing library (for example, OpenGL ES).

The data service is used to store structured data that is related to user privacy and that is generated in a process in which the electronic device runs an application, for example, data such as a database and a table.

The file system is used to store unstructured data that is related to user privacy and that is generated in the process in which the electronic device runs an application, for example, data such as a document, a picture, and a video.

The personal knowledge graph library is used to store the personal knowledge graph.

The surface manager is configured to: manage a display subsystem and provide fusion of 2D and 3D layers for a plurality of applications.

The three-dimensional graphics processing library is configured to implement three-dimensional graphics drawing, image rendering, composition, layer processing, and the like.

The kernel layer is a layer between hardware and software. The kernel layer includes at least a display driver, a camera driver, an audio driver, and a sensor driver.

Figure 4:
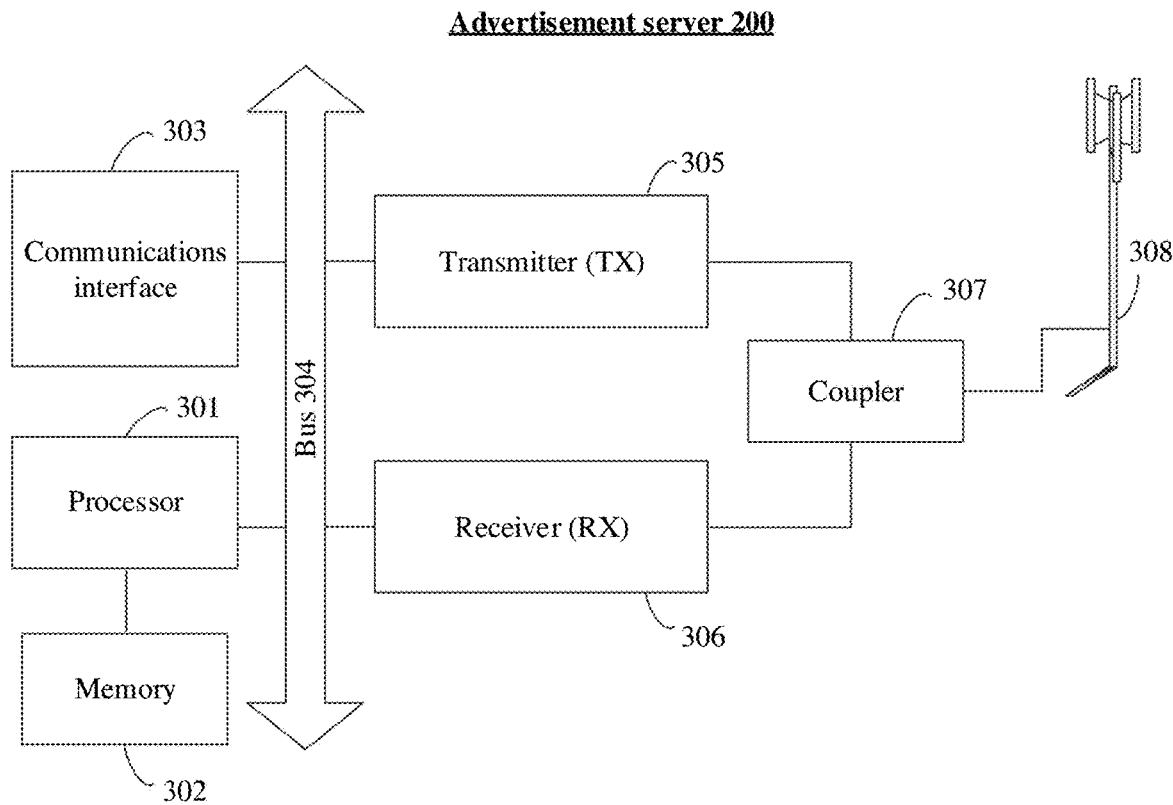
FIG. 4 is a schematic diagram of a hardware structure of an advertisement server 200 according to an embodiment of this application.

FIG. 4 is a schematic diagram of a hardware structure of an advertisement server 200 according to an embodiment of this application.

The advertisement server 200 may include one or more processors 301, a memory 302, a communications interface 303, a transmitter 305, a receiver 306, a coupler 307, and an antenna 308. These components may be connected by using a bus 304 or in another manner. In FIG. 3, an example in which the components are connected by using the bus is used.

The communications interface 303 may be used between the advertisement server 200 and another communications device, and the another communications device may be, for example, the foregoing electronic device or another network device. For example, an application server sends an advertisement recommendation request to the advertisement server 200, the advertisement server 200 receives and responds to the advertisement recommendation request sent by the application server, and the advertisement server 200 sends a pre-ranked advertisement to an application in an electronic device 100. Specifically, the communications interface 303 may be a long term evolution (LTE) (4G) communications interface. The communications interface is not limited to a wireless communications interface. A wired communications interface 303 may alternatively be disposed in the advertisement server 200 to support wired communication. For example, a backhaul link between the advertisement server 200 and another communications device may be a wired communication connection.

In some embodiments of this application, the transmitter 305 and the receiver 306 may be considered as a wireless modem. The transmitter 305 may be configured to perform transmission processing on a signal output by the processor 301. The receiver 306 may be configured to receive a signal. In the advertisement server 200, there may be one or more transmitters 305 and receivers 306. The antenna 308 may be configured to: convert electromagnetic energy in a transmission line into an electromagnetic wave in free space, or convert an electromagnetic wave in free space into electromagnetic energy in a transmission line. The coupler 307 may be configured to: divide a mobile communication signal into a plurality of signals, and allocate the plurality of signals to a plurality of receivers 306.

The memory 302 is coupled to the processor 301, and is configured to store various software programs and/or a plurality of groups of instructions. Specifically, the memory 302 may include a high-speed random access memory, and may further include a nonvolatile memory, for example, one or more magnetic disk storage devices, a flash storage device, or another nonvolatile solid-state storage device.

The memory 302 may store an operating system (which is briefly referred to as a system below), for example, an embedded operating system such as UCOS, VxWorks, or RTLinux. The memory 302 may further store a network communication program. The network communication program may be used to communicate with one or more additional devices, one or more terminal devices, and one or more network devices.

In this embodiment of this application, the processor 301 may be configured to read and execute computer-readable instructions. Specifically, the processor 301 may be configured to: invoke the program stored in the memory 302, for example, a program for implementing, on a side of the advertisement server 200, the method provided in one or more embodiments of this application, and execute instructions included in the program.

It should be noted that the hardware structure of the advertisement server 200 shown in FIG. 4 is merely an implementation in this embodiment of this application. In actual application, the advertisement server 200 may further include more or fewer components. This is not limited herein.

Figure 5:
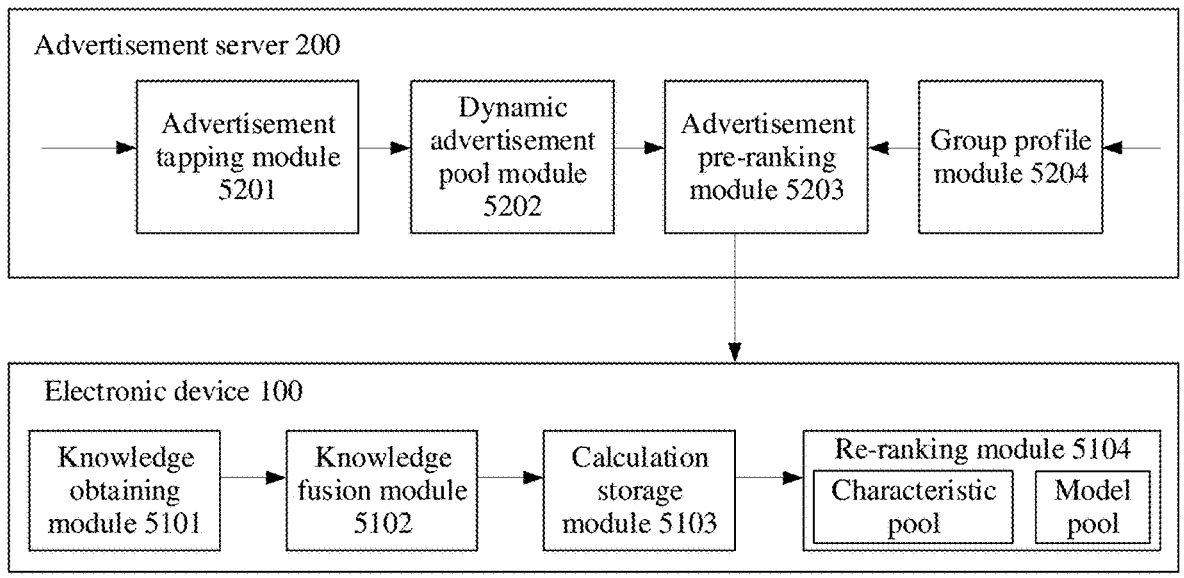
FIG. 5 is a schematic architectural diagram of another advertisement recommendation system according to an embodiment of this application.

FIG. 5 is a schematic architectural diagram of another advertisement recommendation system according to an embodiment of this application.

As shown in FIG. 5, an electronic device 100 may include a knowledge obtaining module 5101, a knowledge fusion module 5102, a calculation storage module 5103, and a re-ranking module 5104.

For description of functions of the knowledge obtaining module 5101, the knowledge fusion module 5102, the calculation storage module 5103, and the re-ranking module 5104, refer to the embodiment shown in FIG. 3. Details are not described herein in this application.

An advertisement server 200 may include an advertisement tapping module 5201, a dynamic advertisement pool module 5202, an advertisement pre-ranking module 5203, and a group profile module 5204.

The advertisement tapping module 5201 may be configured to receive an advertisement recommendation request sent by an application server, and in response to the advertisement recommendation request sent by the application server, the advertisement tapping module 5201 sends an advertisement bidding request to the dynamic advertisement pool module 5202.

The dynamic advertisement pool module 5202 may be configured to receive and respond to the advertisement bidding request sent by the advertisement tapping module 5201.

The dynamic advertisement pool module 5202 may send an advertisement obtaining request to a plurality of advertiser servers, the plurality of advertiser servers receive and respond to the advertisement obtaining request, and the plurality of advertiser servers send advertisements to the dynamic advertisement pool module 5202. In addition, the dynamic advertisement pool module 5202 screens the advertisements sent by the plurality of advertiser servers (for example, screens the advertisements in descending order of prices of the advertisements), to obtain an advertisement set, and the dynamic advertisement pool module 5202 sends the advertisement set to the advertisement pre-ranking module 5203.

The advertisement pre-ranking module 5203 may be configured to receive the advertisement set sent by the dynamic advertisement pool module 5202. The advertisement pre-ranking module 5203 is further configured to receive a group profile sent by the group profile module 5204. The advertisement pre-ranking module 5203 screens advertisements in the advertisement set based on the group profile, to obtain a pre-ranked advertisement. The pre-ranked advertisement may include one or more advertisements. The advertisement pre-ranking module 5203 sends the pre-ranked advertisement to an application.

The application in the electronic device 100 receives the pre-ranked advertisement sent by the advertisement pre-ranking module 5203, and obtains a re-ranking model. The application screens the pre-ranked advertisement based on the re-ranking model, to obtain a to-be-placed advertisement. The application recommends the to-be-placed advertisement to a user for viewing.

The group profile module 5204 may be configured to obtain group data of a user group sent by the application server. The group data may be an advertisement tapped by the user group, an advertisement browsed by the user group, an advertisement closed by the user group, duration of browsing an advertisement by the user group, and the like. The group profile module 5204 performs group profiling for the user group based on the group data of the user group. The group profiling is to label the user group based on the group data of the user group, for example, a type of an advertisement that the user group likes to view or a type of an advertisement that the user group does not like to view.

With reference to a user interface on an electronic device, that the electronic device directly obtains personal data of a user from an application is described below.

Figure 6A:
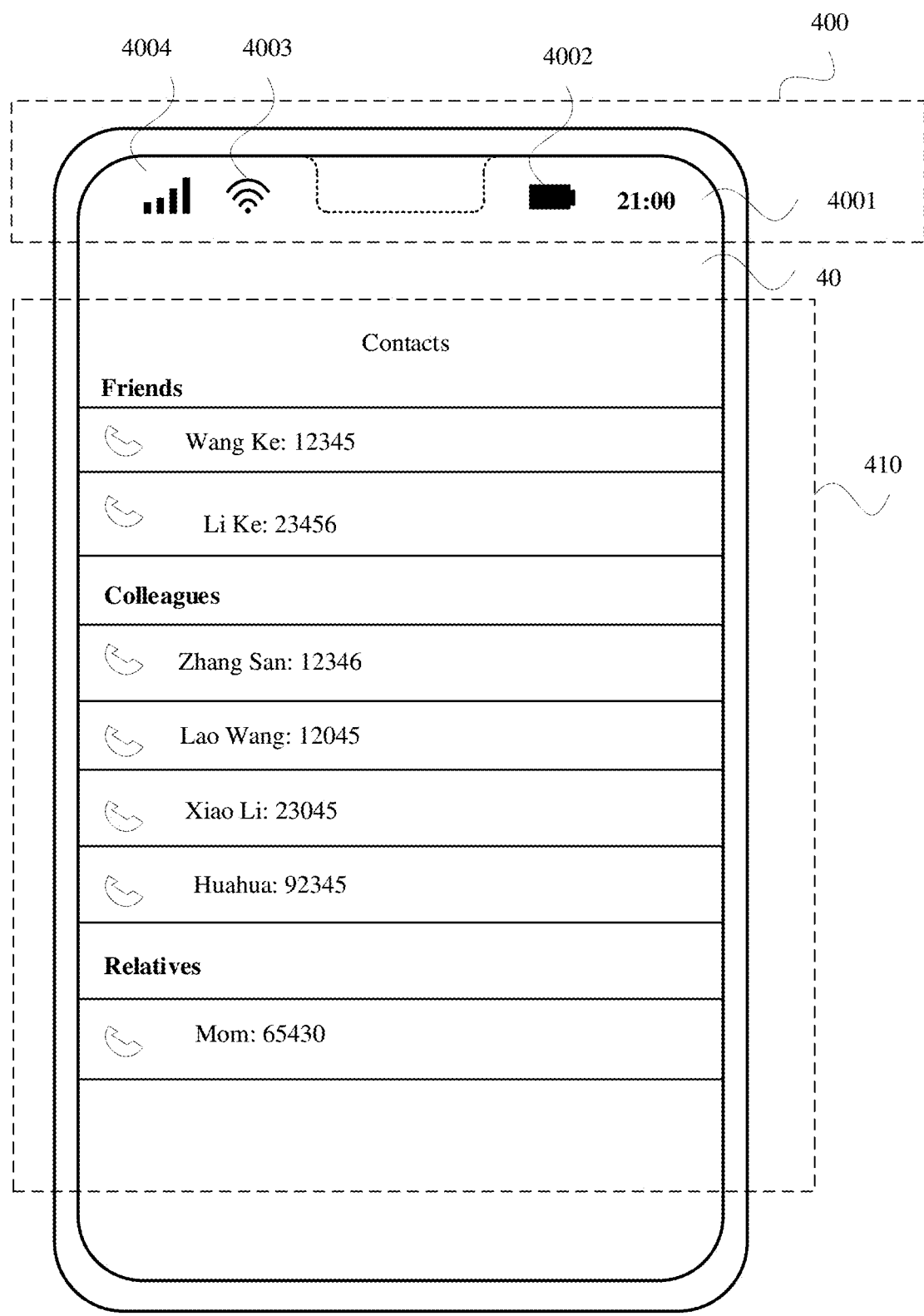
FIG. 6A to FIG. 6E are diagrams of a group of application interfaces according to an embodiment of this application.

For example, as shown in FIG. 6A, FIG. 6A shows an example of a user interface 60 of a contacts application in an electronic device.

The user interface 40 may include a status bar 400 and a contacts list 410.

User contacts may be classified by attributes such as friends, colleagues, and relatives. As shown in FIG. 6A, there may be a friend contact Wang Ke, and a phone number of Wang Ke is 12345; and there may further be a friend contact Li Ke, and a phone number of Li Ke is 23456. There may be a colleague contact Zhang San, and a phone number of Zhang San is 12346; there may further be a colleague contact Lao Wang, and a phone number of Lao Wang is 12045; there may be a colleague contact Zhang San, and a phone number of Zhang San is 12365; there may further be a colleague contact Xiao Li, and a phone number of Xiao Li is 23045; and there may further be a colleague contact Huahua, and a phone number of Huahua is 92345. There may be a relative contact Mom, and a phone number of Mom is 65430.

With reference to a user interface on an electronic device, personal data generated in a process in which the electronic device runs a messaging application is described below by using an example.

The messaging application records short message service message information related to a user, and the electronic device may obtain behavior information related to the user from the short message service message information. For example, if the user buys an air ticket from Beijing to Shanghai by using a ticket buying application, the ticket buying application sends a ticket buying short message service message of the user to the messaging application, and the electronic device may obtain, from the messaging application, a place that the user frequently goes to. For another example, if the user buys a movie ticket by using an application, the application sends a ticket buying short message service message of the user to the messaging application, and the electronic device may obtain, from the messaging application, a type of a movie that the user likes to view.

It may be understood that the electronic device may directly obtain the ticket buying short message service message of the user from the ticket buying application. This is not limited herein in this application.

Figure 6B:
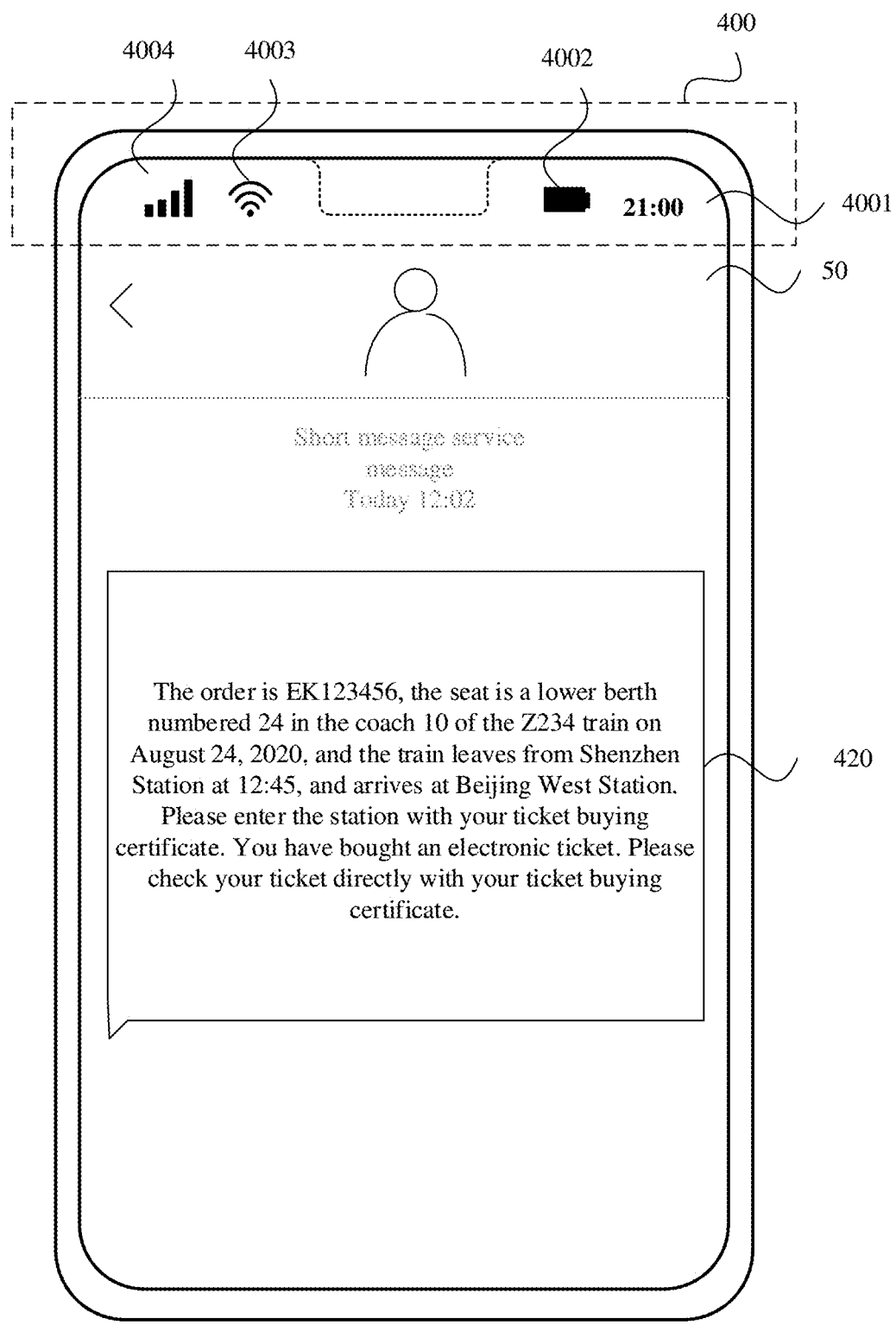

For example, FIG. 6B shows an example of a user interface 50 of a messaging application in an electronic device.

The user interface 50 may include a status bar 400 and a short message service message content display box 420.

The short message service message content display box 420 may include short message service message content, and the short message service message content is "The order is EK123456, the seat is a lower berth numbered 24 in the coach 10 of the Z234 train on Aug. 24, 2020, and the train leaves from Shenzhen Station at 12:45, and arrives at Beijing West Station. Please enter the station with your ticket buying certificate. You have bought an electronic ticket. Please check your ticket directly with your ticket buying certificate.".

The electronic device may learn, based on the short message service message content, that the user is to take a train from Shenzhen Station to Beijing West Station on Aug. 24, 2020, and therefore the electronic device recommends a hotel accommodation advertisement to the user for viewing.

With reference to a user interface on an electronic device, personal data generated in a process in which the electronic device runs a communication application is described below by using an example.

Figure 6C:
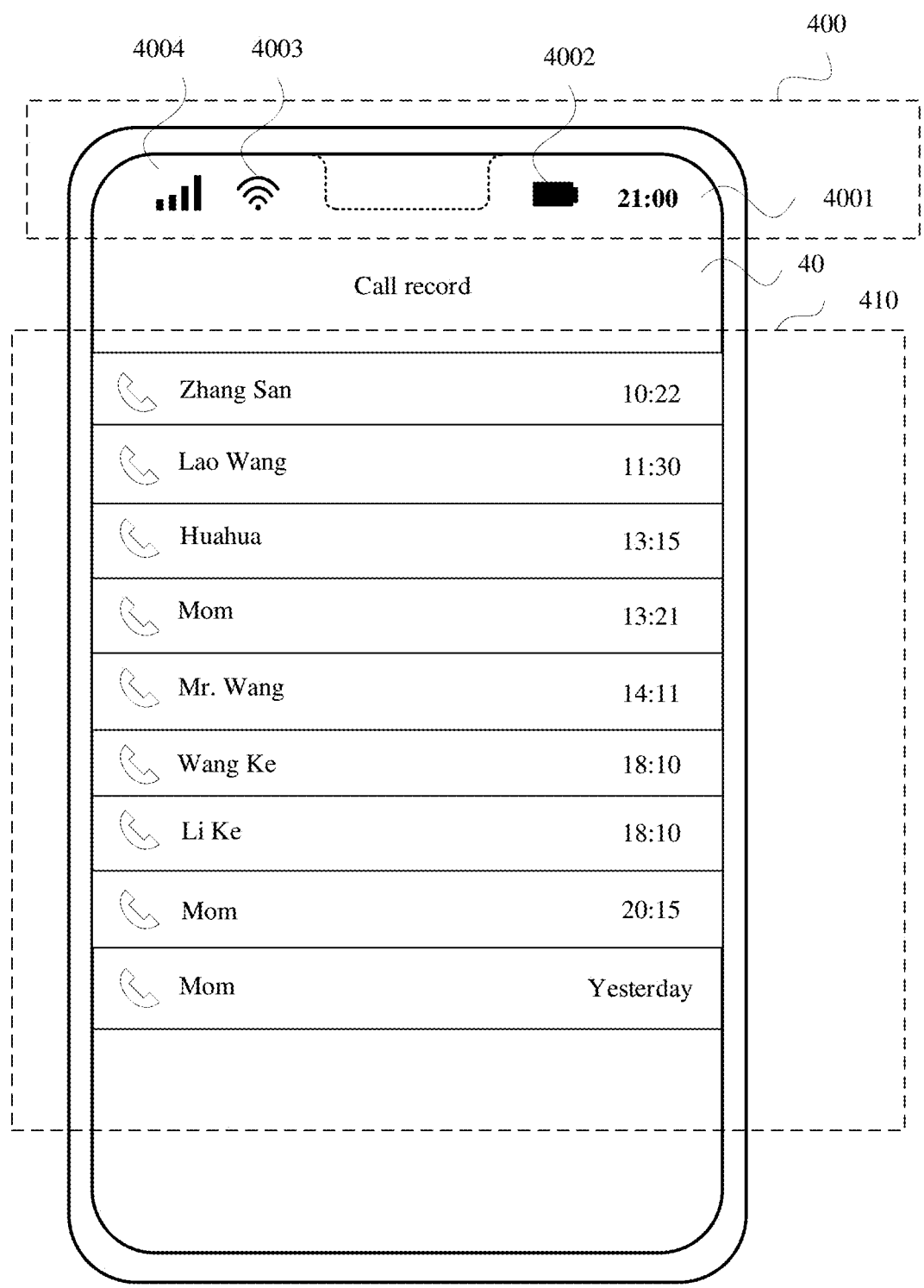

FIG. 6C shows an example of a user interface of a communication application in an electronic device.

The communication application may be a phone application preset in the electronic device. Alternatively, the communication application may be a communication application downloaded by a user from an application store, and the user may make a voice call or a video call with a friend by using the communication application. This is not limited herein in this application.

Description is provided below by using an example in which the communication application is a phone application preset in the electronic device.

When running the phone application, the electronic device may obtain a call frequency between a user contact and the user based on a call record of the user, and therefore the electronic device may infer intimacy between the user contact and the user based on the call frequency between the user contact and the user.

For example, FIG. 6C shows an example of a user interface 40 of a phone application in an electronic device.

The user interface 40 may include a status bar 400 and a call record list 410.

The status bar 400 may include a time indicator 4001, a battery status indicator 4002, one or more signal strength indicators 4003 of a wireless fidelity (wireless fidelity, Wi-Fi) signal, and one or more signal strength indicators 4004 of a mobile communication signal (which may also be referred to as a cellular signal).

The call record list 410 may include one or more call records. For example, the user made a call to Zhang San at 10:22 this morning, the user made a call to Lao Wang at 11:30 this morning, the user made a call to Huahua at 1:15 this afternoon, the user made a call to Mom at 1:21 this afternoon, the user made a call to Mr. Wang at 2:11 this afternoon, the user made a call to Wang Ke at 6:10 this afternoon, the user made a call to Li Ke at 6:10 this afternoon, the user made a call to Mom at 8:15 this evening, and the user made a call to Mom yesterday. The call record list 410 may further include more or fewer call records. No example is provided herein.

With reference to a user interface on an electronic device, personal data generated in a process in which the electronic device runs a memo application is described below by using an example.

Figure 6D:
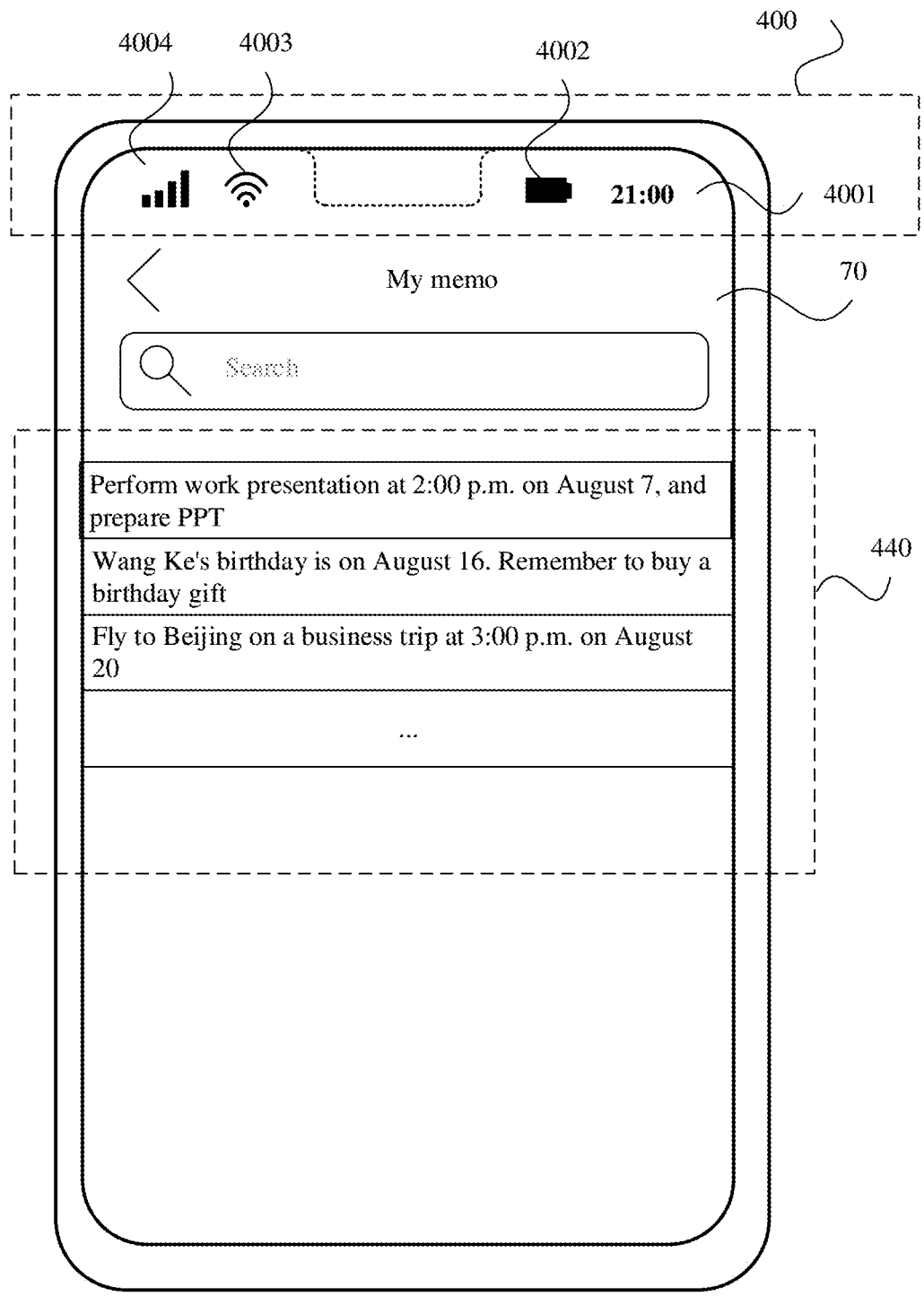

An important thing and time are recorded in the memo application. The electronic device may obtain an important thing and person related to a user from the important thing and time recorded in the memo application, for example, a birthday of a friend and time, a location, and content of a conference. For example, FIG. 6D shows an example of a user interface 70 of a memo application in an electronic device.

The user interface 40 may include a status bar 400 and a "My memo" list 440.

The "My memo" list 440 may include an important thing, an important person, and time recorded by the user, for example, "Perform work presentation at 2:00 p.m. on August 7, and prepare PPT", "Wang Ke's birthday is on August 16. Remember to buy a birthday gift", and "Fly to Beijing on a business trip at 3:00 p.m. on August 20". The "My memo" list 440 may further record more or fewer important things, important persons, and times. Details are not described herein.

With reference to a user interface on an electronic device, personal data generated in a process in which the electronic device runs a memo application is described below by using an example.

A weather condition of a city preset by a user is recorded in a weather application. The electronic device may obtain a city in which the user is located, a weather condition of the city, and the like from a weather module 2106.

Figure 6E:
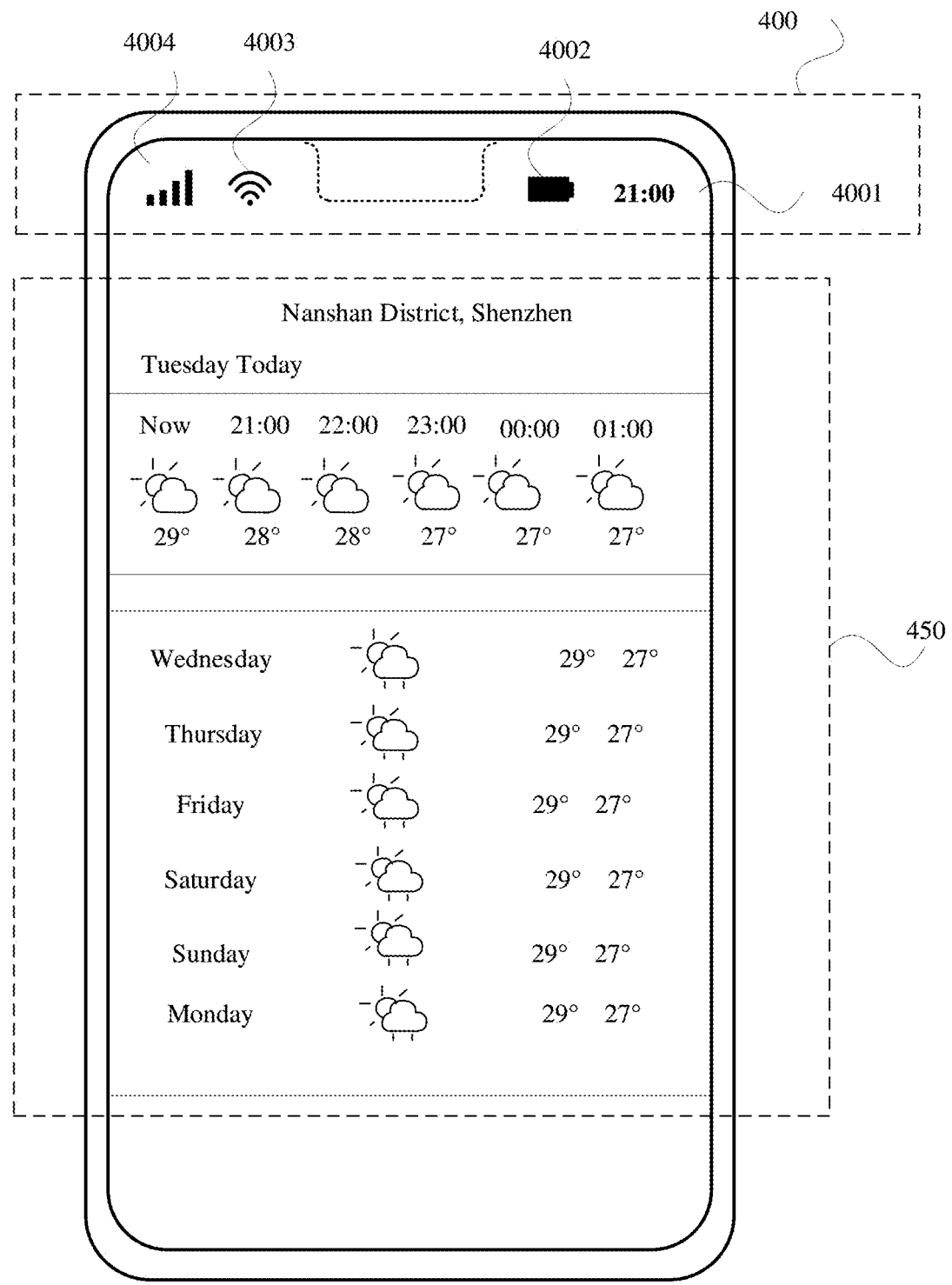

For example, FIG. 6E shows an example of a user interface 80 of Weather in an electronic device.

The user interface 80 may include a status bar 400 and a weather condition list 450 within a week.

The weather condition list 450 within a week may include a daily weather condition of a location within a week. For example, a location of the electronic device is Nanshan District, Shenzhen, it is currently a cloudy day with a temperature of 290 today (Tuesday), it is a cloudy day with a temperature of 280 at 9:00 p.m. today (Tuesday), it is a cloudy day with a temperature of 280 at 10 p.m. today (Tuesday), it is a cloudy day with a temperature of 27° at 11:00 p.m. today (Tuesday), it is a cloudy day with a temperature of 27° at 00:00 a.m. tomorrow (Wednesday), and it is a cloudy day with a temperature of 27° at 1:00 a.m. tomorrow (Wednesday). It is a shower with a highest temperature of 29° and a lowest temperature of 27° on Wednesday; it is a shower with a highest temperature of 29° and a lowest temperature of 27° on Thursday; it is a shower with a highest temperature of 29° and a lowest temperature of 27° on Friday; it is a shower with a highest temperature of 29° and a lowest temperature of 27° on Saturday; it is a shower with a highest temperature of 29° and a lowest temperature of 27° on Sunday; and it is a shower with a highest temperature of 29° and a lowest temperature of 27° on next Monday.

In the foregoing UI embodiments, that the electronic device 100 may obtain personal data of a user from the foregoing applications is merely described by using examples. The personal data may alternatively come from another application. Details are not described herein in this application.

Figure 7:
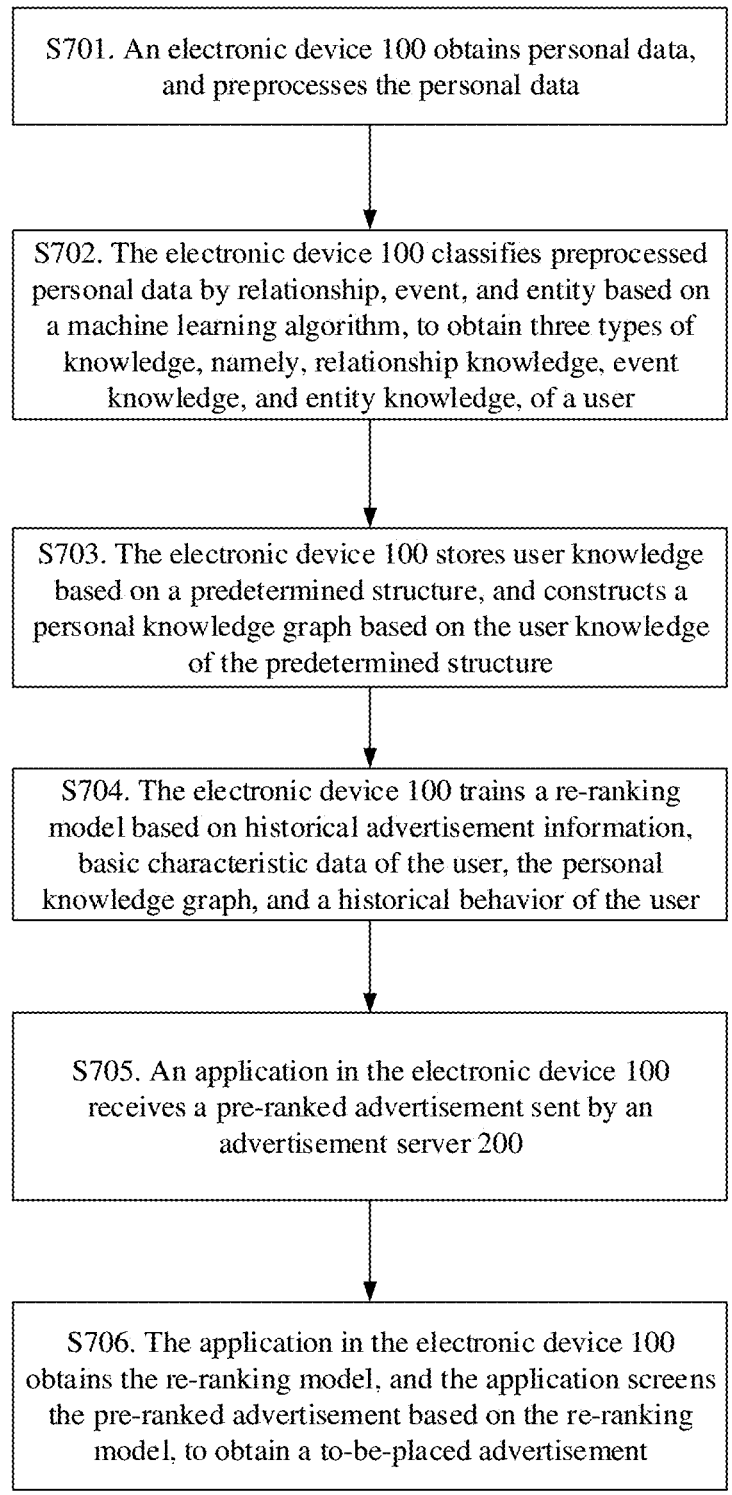
FIG. 7 is a schematic flowchart of an advertisement display method according to an embodiment of this application.

FIG. 7 is a schematic flowchart of an advertisement display method according to an embodiment of this application.

The method includes the following steps.

S701. An electronic device 100 obtains personal data, and preprocesses the personal data.

Data generated in a running process of each application in the electronic device is stored in a data service and/or a file system, and the electronic device 100 may obtain the personal data of a user from the data service and/or the file system.

In addition, the application in the electronic device may obtain authorization from the user, and after obtaining authorization from the user, the electronic device may directly obtain the personal data of the user from each application.

For example, the electronic device 100 may directly obtain interpersonal relationship knowledge of the user from a contacts application, a communication application, and the like, for example, user knowledge such as a friend relationship of the user, a colleague relationship of the user, a relative of the user, and a customer relationship of the user.

The electronic device 100 may directly obtain user knowledge such as a friend birthday, conference information, a travel city, an academic paper, and a departure date of the user from a messaging application, a memo application, and the like.

The electronic device 100 may obtain user knowledge such as a thing, a city, a singer, and a song name that the user likes, and an actor that the user is interested in from a gallery application.

The electronic device 100 may obtain user knowledge such as a city area in which the user is located, a weather condition, and a motion status from a wearable device (for example, a Bluetooth watch).

For example, the electronic device 100 obtains description information and data of a television series 1 from a video application. The description information and the data of the television series 1 are shown in Table 2.

TABLE 2

| Television series name | Introduction to the television series | Release time |
|---|---|---|
| Television series 1 | The television series 1 is a hot-blooded youth drama directed by a director 1 and a director 2 and starred by an actor 1 and an actor 2. The drama tells that Wang Yi is ordered in face of danger to execute one top-secret mission, and during this period, Wang Er and Wang San make a deep friend relationship with Wang Si, Wang Wu, and others in constant misunderstanding and suspicion. | The drama premiered in Apple Video on May 4, 2020. |

The electronic device 100 is further configured to preprocess the personal data. The reprocessing includes cleansing and deduplicating the personal data. The cleansing the personal data includes performing word segmentation and part-of-speech tagging on text information through natural language processing, and deleting a word that does not belong to a preset part of speech from the text information based on the preset part of speech, for example, deleting an article, a preposition, an adverb, a conjunction, a verb, or a modal particle. The preset part of speech may be customized by the user, and the preset part of speech may be set based on an actual requirement.

The personal data of the user obtained by the electronic device 100 from the data service and/or the file system and the personal data of the user directly obtained from each application include repeated data, and when the electronic device 100 directly obtains the personal data of the user from each application, the personal data in each application may also include repeated data. Therefore, a knowledge fusion module deduplicates the cleansed text information to delete repeated data, to reduce data redundancy.

For example, that the electronic device 100 preprocesses the obtained description information and data of the television series 1 specifically includes performing word segmentation and part-of-speech tagging on the description information and the data of the television series 1. For a rule for part-of-speech tagging, refer to the embodiment in FIG. 3. Details are not described herein in this application.

A result of preprocessing the description information and the data of the television series 1 by the electronic device 100 is shown in Table 3.

TABLE 3

| Television series name | Introduction to the television series | Release time |
|---|---|---|
| Television series 1/n | The television series 1/n is/v a hot-blooded/a youth drama/n directed/v by/p a director 1/nr and/c a director 2/nr and/c starred/v by/p an actor 1/nr and/c an actor 2/nr./w The drama/r tells/v that/u Wang Yi/nr is/v ordered/v in face of danger/i to/u execute/v one/m top-secret/a mission/n, and/c during this period/l, Wang Er/nr and/c Wang San/nr make/v a deep/a friend relationship/n with/p Wang Si/nr, Wang Wu/nr, and/c others/r in/p constant/a misunderstanding/n and/c suspicion/n./w | The drama/r premiered/v in/p Apple/n Video/n on/p May/m 4/m, 2020/m./w |

For example, the electronic device 100 cleanses, based on the preset part of speech, the description information and the data of the television series 1 obtained after word segmentation and part-of-speech tagging, to obtain words such as a personal name, a place name, a song name, a movie and television series name, time, and an actor. The description information and the data of the television series 1 obtained after word segmentation and part-of-speech tagging are shown in Table 4.

TABLE 4

| Television series name | Personal name | Time | Actor |
|---|---|---|---|
| Television series 1/nr | Director 1/nr Director 2/nr Wang Yi/nr Wang Er/nr Wang San/nr Wang Si/nr Wang Wu/nr | May/m 4/m, 2020/m | Actor 1/nr Actor 2/nr |

S702. The electronic device 100 classifies preprocessed personal data by relationship, event, and entity based on a machine learning algorithm, to obtain three types of knowledge, namely, relationship knowledge, event knowledge, and entity knowledge, of the user.

For details, refer to the embodiment in FIG. 3. Details are not described herein.

S703. The electronic device 100 stores the user knowledge based on a predetermined structure, and constructs a personal knowledge graph based on the user knowledge of the predetermined structure.

Specifically, the electronic device 100 stores the relationship knowledge based on the predetermined structure. The relationship knowledge is stored based on the predetermined structure, so that the relationship knowledge and time are correspondingly stored, to reflect an association between the relationship knowledge and the time. For example, the relationship knowledge and the time may be stored based on a 5-tuple structure, and the 5-tuple structure is "entity 1-relationship-entity 2-time point-time interval".

For example, the relationship knowledge is "I-customer-Mr. Wang-2019.6.8-14". The relationship knowledge means that I and the customer Mr. Wang met on Jun. 8, 2019 and have known each other for 16 months up to now (for example, Aug. 10, 20202).

Herein, a time interval, namely, 203 days, is expressed in a quantity of months, or may be expressed in a quantity of years or a quantity of days. This is not limited in this application.

In some embodiments, the electronic device 100 may alternatively represent only a relationship between entities by using only a time point. A basic format is "entity 1-relationship-entity 2-time point".

For example, the relationship knowledge is "I-colleague-Zhang San-2019.4.5". The relationship knowledge means that I met the colleague Zhang San on Apr. 15, 2019.

The electronic device 100 stores the event knowledge based on the predetermined structure. The event knowledge is stored based on the predetermined structure, so that the event knowledge and time are correspondingly stored, to reflect an association between the event knowledge and the time. For example, the event knowledge and the time may be stored based on a 5-tuple structure, and the 5-tuple structure is "event-argument-logical relationship-time point-time interval".

Herein, the argument is an action that supports the event, and the logical relationship may be a causal relationship, a sequential relationship, or the like.

For example, the event knowledge is "go on a business trip-buy an air ticket-sequential-2020.9.1-3 days". The event knowledge expresses the event of going on a business trip, there is a sequential relationship between going on a business trip and buying an air ticket, a departure date is Sep. 1, 2020, and a schedule is 3 days.

For example, the event knowledge is "go to the duty-free shop-buy cosmetics-causal-2020.8.20-2 days". The event knowledge expresses the buying event, there is a causal relationship between going to the duty-free shop and buying cosmetics, a departure date is Aug. 20, 2020, and a schedule is 2 days.

In some embodiments, the electronic device 100 may alternatively represent only an event of the user that occurs by using a time point. A basic format is "entity 1: event-argument-logical relationship-time point".

For example, the event knowledge is "go on a business trip-buy an air ticket-sequential-2020.9.1". The event knowledge expresses the event of going on a business trip, there is a sequential relationship between going on a business trip and buying an air ticket, and a departure date is Sep. 1, 2020.

The electronic device 100 stores the entity knowledge based on the predetermined structure. The entity knowledge is stored based on the predetermined structure, so that the entity knowledge and time are correspondingly stored, to reflect an association between the entity knowledge and the time. For example, the entity knowledge and the time may be stored based on a 5-tuple structure, and the 5-tuple structure is "entity 1: time-association weight-entity 2-relationship weight-entity 3".

For example, the entity knowledge is "television series 1: 2020.4.6-1.0-actor 1-0.8-actor 3". The entity knowledge indicates that the television series 1 is released on Apr. 6, 2020, a degree of association between the television series 1 and the actor 1 is 1.0, and a degree of association between the actor 1 and the actor 3 is 0.8. This indicates that there is a higher degree of association between the television series 1 and the actor 1.

For example, the entity knowledge is "television series 2: 2020.2.1-0.6-actor 2-0.8-actor 1". The entity knowledge indicates that the television series 2 is released on Feb. 1, 2020, a degree of association between the television series 2 and the actor 2 is 0.6, and a degree of association between the actor 2 and the actor 1 is 0.8. This indicates that there is a higher degree of association between the television series 2 and the actor 1.

For example, the electronic device 100 performs entity mining on the description information and the data of the television series 1 that are obtained after cleansing and deduplication, and establishes time-based entity knowledge, namely, television series 1: 2020-1.0-actor 1-0.8-actor 2.

The electronic device 100 constructs the personal knowledge graph based on the event knowledge of the predetermined structure, the relationship knowledge of the predetermined structure, and the entity knowledge of the predetermined structure.

The personal knowledge graph graphically represents the user knowledge of the predetermined structure.

FIG. 8 is a schematic diagram of graphically representing a constructed personal knowledge graph according to an embodiment of this application. It may be understood that the personal knowledge graph in FIG. 8 shows a personal knowledge graph only of a part of the user knowledge of the user, and the personal knowledge graph may further include more or less user knowledge.

As shown in FIG. 8, the personal knowledge graph of the user may include the relationship knowledge, the event knowledge, and the entity knowledge.

For specific description of the relationship knowledge, the event knowledge, and the entity knowledge of the user in the personal knowledge graph shown in FIG. 8, refer to the description in the foregoing embodiment. Details are not described in this application.

It should be noted that user knowledge obtained by the electronic device 100 from each application module changes in real time, and therefore the personal knowledge graph constructed by the electronic device 100 based on the user knowledge obtained from each application module also needs to be updated in real time. In this way, the personal knowledge graph can more accurately express a characteristic of the user.

After the electronic device 100 constructs the time-based personal knowledge graph of the user, the electronic device 100 may further update the user knowledge in the personal knowledge graph. Specifically, the personal knowledge graph may retain only user knowledge of the user in a recent time period, and the electronic device 100 may filter out user knowledge that does not belong to the recent time period from the personal knowledge graph. In this way, a characteristic of the user depicted by an updated personal knowledge graph is more accurate. In addition, storage resources of the electronic device 100 can be saved.

How the electronic device 100 updates the personal knowledge graph is described below.

The electronic device 100 may update the personal knowledge graph from two aspects: The electronic device 100 adds new knowledge of the user to the personal knowledge graph, and the electronic device 100 filters out existing knowledge of the user from the personal knowledge graph.

How the electronic device 100 filters out the existing knowledge of the user from the personal knowledge graph is described below.

Specifically, in some embodiments, the electronic device 100 may retain only user knowledge in a recent time period (for example, two years) in the personal knowledge graph, and filter out user knowledge in a time period other than the recent time period (for example, two years) from the personal knowledge graph.

In some other embodiments, the electronic device 100 may alternatively filter out the existing knowledge of the user from the personal knowledge graph based on a memory size of the personal knowledge graph.

Specifically, if the electronic device 100 detects that the memory size of the personal knowledge graph of the user is close to a preset memory size, the electronic device 100 may retain knowledge in a recent time period in the personal knowledge graph based on the preset memory size.

In this embodiment of this application, the personal knowledge graph of the user may alternatively be updated in another manner. The foregoing embodiment is merely used to explain this application, and should not be construed as a limitation.

The electronic device 100 may update the personal knowledge graph in a specific time interval.

In some embodiments, the electronic device 100 may update the personal knowledge graph based on a fixed time (for example, 1 day).

In some other embodiments, the electronic device 100 may update the personal knowledge graph based on a behavior habit of the user.

For example, in a time period "22:00-8:00", the user rests at home, and the electronic device 100 is in a standby state. In this case, the electronic device 100 may update the personal knowledge graph in the time period "22:00-8:00". When the electronic device 100 updates the personal knowledge graph, specific memory space of the electronic device 100 is occupied. Therefore, the electronic device 100 updates the personal knowledge graph during the rest time of the user, so that more memory space is reserved for a user operation, to ensure smoothness of the user operation.

S704. The electronic device 100 trains a re-ranking model based on historical advertisement information, basic characteristic data of the user, the personal knowledge graph, and a historical behavior of the user.

For how the electronic device 100 trains the re-ranking model, refer to the embodiment in FIG. 3. Details are not described herein.

It should be noted that the electronic device 100 trains the re-ranking model based on data such as the personal knowledge graph. It may be learned from the foregoing embodiment that the personal knowledge graph is updated as time goes by. In this case, the electronic device 100 should also update the re-ranking model as time goes by. In this way, an advertisement ranking list obtained by re-ranking a plurality of input advertisements by the re-ranking model is more accurate.

How the electronic device 100 updates the re-ranking model is described below.

In some embodiments, the electronic device 100 may update the re-ranking model based on a fixed time (for example, 1 day).

In some embodiments, the electronic device 100 may update the personal knowledge graph based on a behavior habit of the user.

For example, in a time period "22:00-8:00", the user rests at home, and the electronic device 100 is in a standby state.

In this case, the electronic device 100 may update the re-ranking model in the time period "22:00-8:00". When the electronic device 100 updates the re-ranking model, specific memory space of the electronic device 100 is occupied. Therefore, the electronic device 100 does not update the re-ranking model when the user uses the electronic device 100, so that more memory space is reserved for a user operation, to ensure smoothness of the user operation.

S705. An application in the electronic device 100 receives a pre-ranked advertisement sent by an advertisement server 200.

The electronic device 100 detects a user operation, and in response to the user operation, the electronic device 100 sends a user request to an application server 300, and the application server 300 sends an advertisement recommendation request to the advertisement server 200.

For example, the user operation may be that the electronic device 100 detects that the user starts the application or the electronic device 100 detects that the user slides to a current browsing interface of a next video in the application (for example, the electronic device 100 detects that the user slides down to the current browsing interface of the next video with a single finger). In this case, the electronic device 100 sends the user request to the application server 300.

Figure 9A:
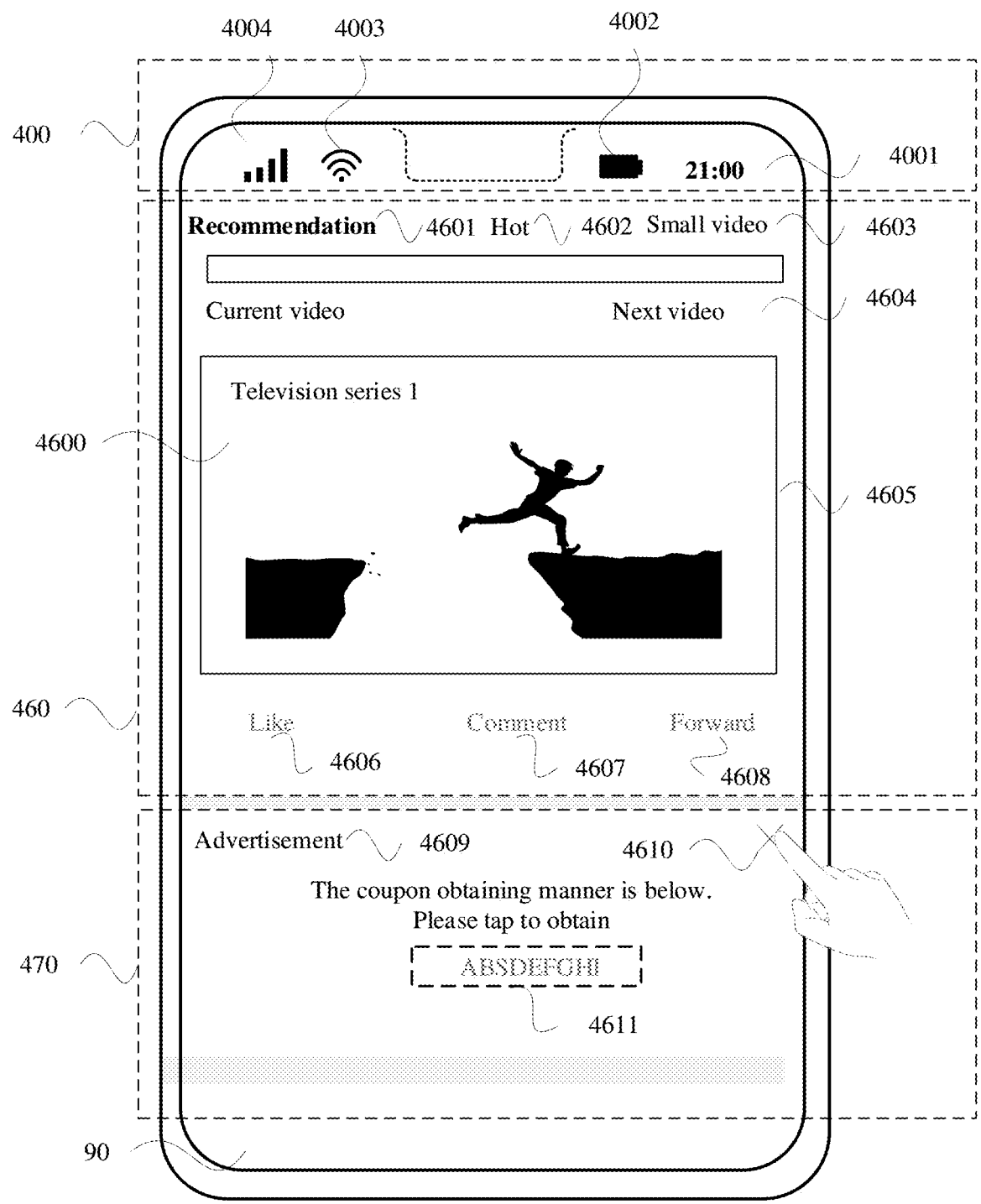
FIG. 9A to FIG. 9C are diagrams of a group of UIs according to an embodiment of this application.

For example, FIG. 9A shows an example of a user interface 90 of a current browsing interface of an application.

The user interface 90 may include a status bar 400, a current video browsing interface 460, and an advertisement display area 470.

The current video browsing interface 460 includes a "Recommendation" control 4601, a "Hot" control 4602, a "Small video" control 4603, a "Next video" control 4604, a video display window 4605, a "Like" control 4606, a "Comment" control 4607, and a "Forward" control 4608.

The advertisement display area 470 includes an advertisement icon 4609, a close control 4610, and an advertisement link control 4611.

Video content 4600 of a currently played video (for example, the television series 1) is displayed in the video display window 4605.

The "Next video" control 4604 may receive a tap operation performed by the user, and in response to the tap operation performed by the user, the current video browsing interface 460 displays video content of another video.

In response to an operation of tapping the "Next video" control 4604 by the user, the electronic device 100 sends the user request to the application server 300, the application server 300 sends the advertisement recommendation request to the advertisement server 200, the advertisement server 200 sends a new advertisement to the application in the electronic device 100 in response to the advertisement recommendation request, and the advertisement display area 470 displays new advertisement content.

The current browsing interface of the application may further receive an operation of sliding down to the current browsing interface of the next video by the user with a single finger. In response to the operation that is of sliding down by the user with a single finger and that is performed on the current browsing interface, the electronic device 100 sends the user request to the application server 300, the application server 300 sends the advertisement recommendation request to the advertisement server 200, the advertisement server 200 sends a new advertisement to the application in the electronic device 100 in response to the advertisement recommendation request, and the advertisement display area 470 displays new advertisement content.

How the advertisement server 200 sends the pre-ranked advertisement to the application in the electronic device 100 is described below.

The advertisement server 200 first performs group profiling for a user group based on group data.

The advertisement server 200 obtains the group data. The group data may be an advertisement tapped by the user, an advertisement browsed by the user, an advertisement closed by the user, and the like.

Figure 9B:
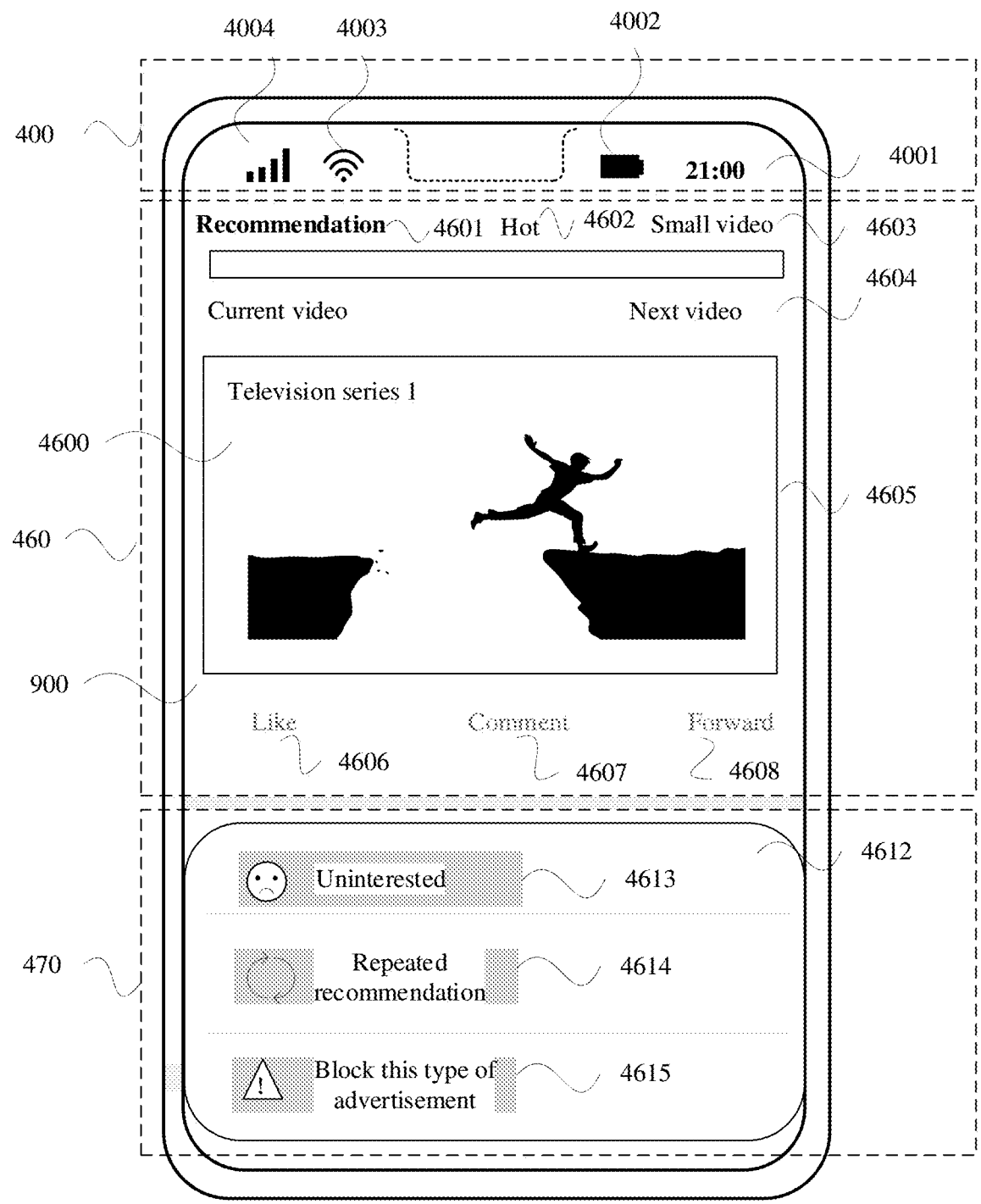
Figure 9C:
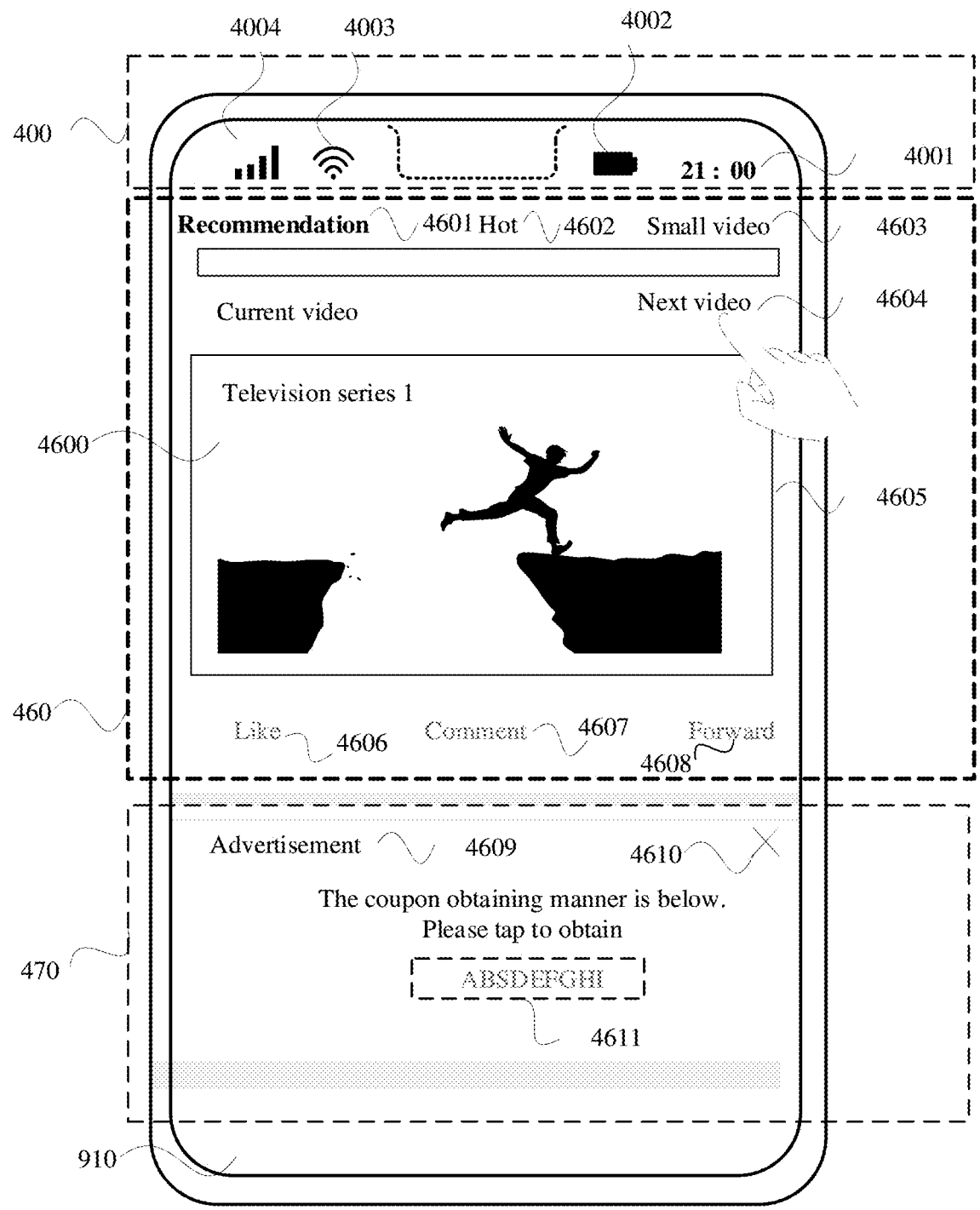
Figure 10:
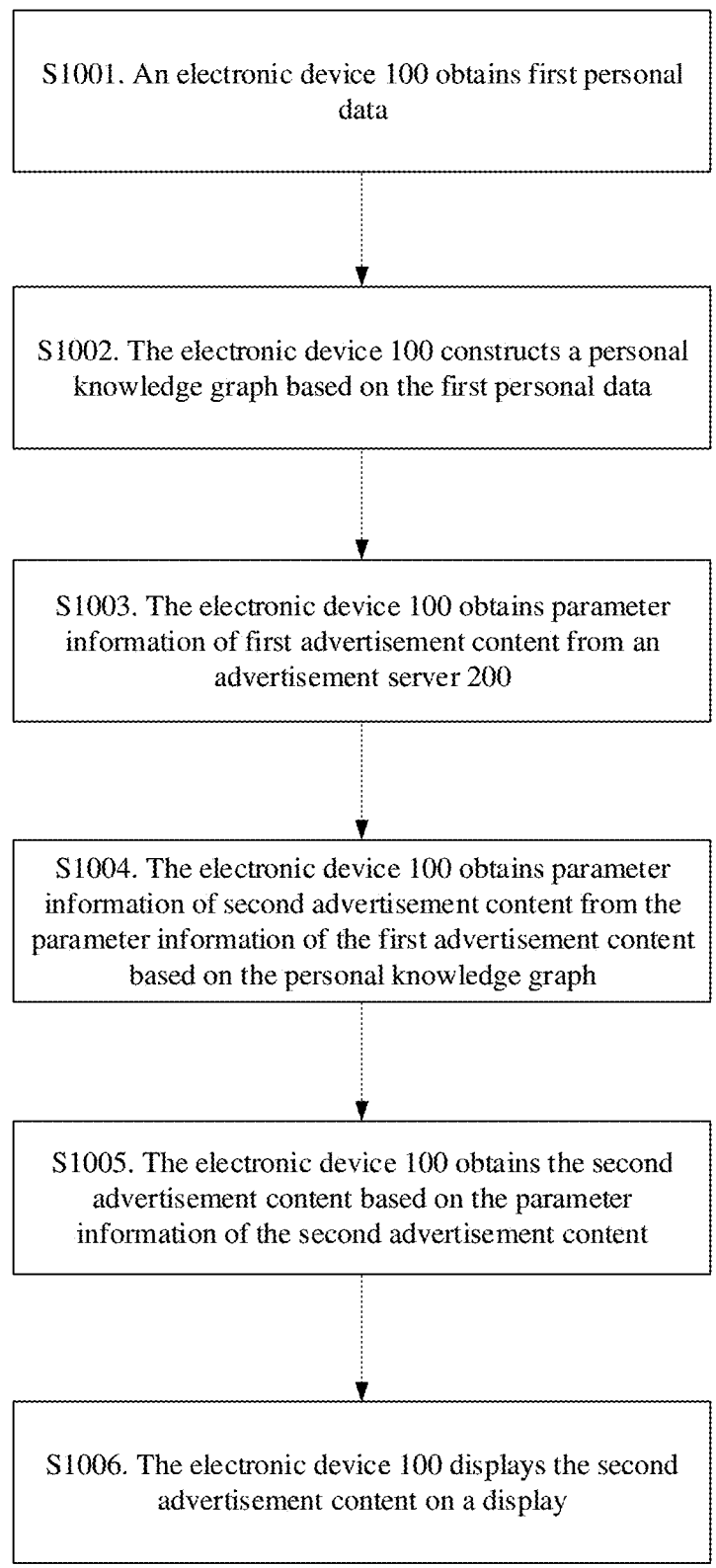
FIG. 10 is a schematic flowchart of another advertisement display method according to an embodiment of this application.

FIG. 9B and FIG. 9C are diagrams of an example user interface UI for obtaining the group data by the advertisement server 200.

For example, FIG. 9B shows an example of a user interface 900 of a current browsing interface of an application.

The user interface 900 may include a status bar 400, a current video browsing interface 460, and an advertisement display area 470.

The current video browsing interface 460 includes a "Recommendation" control 4601, a "Hot" control 4602, a "Small video" control 4603, a "Next video" control 4604, a video display window 4605, a "Like" control 4606, a "Comment" control 4607, and a "Forward" control 4608.

The advertisement display area 470 includes an advertisement icon 4609, a close control 4610, and an advertisement link control 4611.

Video content 4600 of a currently played video (for example, the television series 1) is displayed in the video display window 4605.

The "Next video" control 4604 may receive a tap operation performed by the user, and in response to the tap operation performed by the user, the current video browsing interface 460 displays video content of another video.

The advertisement display area 470 displays advertisement content. The advertisement content is "The coupon obtaining manner is below. Please tap to obtain ABCDEFGHI".

The advertisement link control 4611 may receive a tap operation performed by the user, and in response to the tap operation performed by the user, the user interface 910 displays a user interface of the advertisement. In addition, in response to the operation of tapping the advertisement link control 4611 by the user, the application server 300 reports a behavior that the user taps and views the advertisement to the advertisement server 200. The behavior that the user taps and views the advertisement may be used as a piece of service data of the advertisement.

The close control 4610 may also receive a tap operation performed by the user, and in response to the tap operation performed by the user, the advertisement display area 470 displays a selection prompt box 4612 shown in FIG. 9C. The selection prompt box 4612 includes an "Uninterested" control 4613, a "Repeated recommendation" control 4614, and a "Block this type of advertisement" control 4615.

The "Uninterested" control 4613 may receive a tap operation performed by the user, and in response to the tap operation performed by the user, the advertisement display area 470 does not display the advertisement. The "Repeated recommendation" control 4614 may receive a tap operation performed by the user, and in response to the tap operation performed by the user, the advertisement display area 470 does not recommend the advertisement to the user for viewing within a specific time (for example, 48 hours). The "Block this type of advertisement" control 46154614 may receive a tap operation performed by the user, and in response to the tap operation performed by the user, the advertisement display area 470 does not recommend this type of advertisement (for example, a makeup advertisement) to the user for viewing.

In addition, in response to the operation of tapping the close control 4610 by the user, the application server 300 reports a behavior that the user closes the advertisement and does not view the advertisement to the advertisement server 200. The behavior that the user closes the advertisement and does not view the advertisement may be used as a piece of group data of the advertisement.

The group data of the advertisement may alternatively come from another manner. The foregoing embodiment is merely used to explain this application. This is not limited in this embodiment of this application.

The application server 300 collects the group data, and reports the group data to the advertisement server 200. The advertisement server 200 performs group profiling for the user group based on groups of all users. The group profiling is to label the user group based on group data of all the users, for example, a type of an advertisement that the user group likes to view or a type of an advertisement that the user group does not like to view.

It may be understood that the group data of all the users collected by the application server 300 changes in real time. Therefore, the group data of all the users that is sent by the application server 300 and that is received by the advertisement server 200 also changes in real time.

The advertisement server 200 may perform group profiling for the user group based on a fixed time (for example, 1 day) based on the group data of all the users. In this case, the group profile of the user group is also periodically updated.

The advertisement server 200 then screens advertisements based on the group profile of the user group, to obtain the pre-ranked advertisement.

The pre-ranked advertisement may be one or more advertisements.

The pre-ranked advertisement is obtained by screening a plurality of advertisements in an advertisement set based on the group profile of the user group. The advertisement server 200 sends the pre-ranked advertisement to the application in the electronic device 100.

The application in the electronic device 100 receives the pre-ranked advertisement sent by the advertisement server 200.

It may be learned from the foregoing embodiments that in some embodiments, the advertisement server 200 may classify user groups. For example, the user groups may be classified into a female user group and a male user group, or the user groups may be classified into user groups of various age groups.

For example, when the advertisement server 200 classifies the user groups into a female user group and a male user group, the advertisement server 200 performs profiling for each of the male user group and the female user group.

Specifically, the advertisement server 200 screens a plurality of advertisements based on a group profile of male users, to obtain a pre-ranked advertisement of the male users. The advertisement server 200 pushes the pre-ranked advertisement of the male users to an electronic device of the male users.

The advertisement server 200 screens a plurality of advertisements based on a group profile of female users, to obtain a pre-ranked advertisement of the female users. The advertisement server 200 pushes the pre-ranked advertisement of the female users to an application in an electronic device of the female users.

For example, when classifying the user groups into user groups of various age groups, the advertisement server 200 may perform profiling for the user groups of various age groups based on the user groups.

Specifically, the advertisement server 200 performs profiling for a user group of users aged between 21 and 35, and screens a plurality of advertisements based on a group profile of the users aged between 21 and 35, to obtain a pre-ranked advertisement of the users aged between 21 and 35. The advertisement server 200 pushes the pre-ranked advertisement of the users aged between 21 and 35 to an application in an electronic device of the users aged between 21 and 35.

The advertisement server 200 performs profiling for a user group of users aged between 36 and 50, and screens a plurality of advertisements based on a group profile of the users aged between 36 and 50, to obtain a pre-ranked advertisement of the users aged between 36 and 50. The advertisement server 200 pushes the pre-ranked advertisement of the users aged between 36 and 50 to an application in an electronic device of the users aged between 36 and 50.

The advertisement server 200 performs profiling for a user group of users aged between 51 and 70, and screens a plurality of advertisements based on a group profile of the users aged between 51 and 70, to obtain a pre-ranked advertisement of the users aged between 51 and 70. The advertisement server 200 pushes the pre-ranked advertisement of the users aged between 51 and 70 to an application in an electronic device of the users aged between 51 and 70.

S706. The application in the electronic device 100 obtains the re-ranking model, and the application screens the pre-ranked advertisement based on the re-ranking model, to obtain a to-be-placed advertisement.

There may be one or more to-be-placed advertisements.

For how the application obtains the to-be-placed advertisement based on the pre-ranked advertisement, refer to the embodiment in FIG. 3. Details are not described herein.

How the application displays the to-be-placed advertisement is described below.

The electronic device 100 starts the application, there is one advertisement slot in the current browsing interface of the application, and one or more advertisements may be displayed in the advertisement slot.

For example, if advertisement duration of the advertisement slot is 60 seconds, only one advertisement may be displayed in the advertisement slot, and a time of the advertisement is 60 seconds.

For example, if advertisement duration of the advertisement slot is 60 seconds, six advertisements may be displayed in the advertisement slot, and a display time of each advertisement is 10 seconds.

It should be noted that the foregoing embodiment is merely used to explain this application. A quantity of advertisements displayed in each advertisement slot and an advertisement time are not limited in this application.

This application is not limited to advertisement recommendation, and may be further applied to content recommendation. The content recommendation may include song recommendation, electronic book recommendation, movie and television series recommendation, food recommendation, shopping recommendation, and the like. This is not limited in this application.

FIG. 1 is a schematic flowchart of another advertisement display method according to an embodiment of this application.

The method includes the following steps.

S1001. An electronic device 100 obtains first personal data.

The electronic device 100 obtains the first personal data. The first personal data is personal information of a user. The personal information may be one or more of the following: a gender, an age, a personality, a hobby, an interpersonal relationship, income, contacts information, a call record, a short message service message, memo information, a residence address, and a weather condition at the residence address.

In some embodiments, the electronic device 100 may obtain the first personal data of the user at regular intervals (for example, one week).

Specifically, for obtaining the first person data by the electronic device 100, refer to the embodiments in FIG. 6A to FIG. 6D and the embodiment in S701. Details are not described herein in this application.

S1002. The electronic device 100 constructs a personal knowledge graph based on the first personal data.

Before constructing the personal knowledge graph based on the first personal data, the electronic device 100 needs to preprocess the first personal data. That the electronic device 100 preprocesses the first personal data includes the following two steps:

Step 1: The electronic device converts the first personal data into text information, and performs sentence segmentation, word segmentation, and part-of-speech tagging on the text information; and the electronic device obtains a word that belongs to a preset part of speech from the text information.

Step 2: After the electronic device obtains the word that belongs to the preset part of speech from the text information, the electronic device 100 deduplicates words in the text information, to remove data redundancy.

Specifically, the electronic device 100 needs to obtain a word that appears once in the text information; and when two or more same words appear in the text information, the electronic device 100 retains one of the two or more same words in the text information.

That is, the electronic device 100 obtains second personal data from the first personal data. The second person data includes relationship knowledge, event knowledge, and entity knowledge.

Specifically, for preprocessing the first person data by the electronic device 100, refer to the embodiment in S701. This is not limited herein in this application.

That the electronic device 100 constructs a personal knowledge graph based on the first personal data specifically includes the following steps:

The electronic device 100 stores the relationship knowledge, the event knowledge, and the entity knowledge based on a predetermined structure. The predetermined structure may be a 5-tuple structure.

Specifically, the electronic device 100 stores the relationship knowledge based on a first 5-tuple structure. The first 5-tuple structure is "first entity-relationship-second entity-first time point-first time interval". The relationship represents a relationship between the first entity and the second entity, the first time point is a time at which the relationship is established between the first entity and the second entity, and the first time interval is a time interval between the first time point and a current time point.

The electronic device 100 stores the event knowledge based on a second 5-tuple structure. The second 5-tuple structure is "event-argument-logical relationship-second time point-second time interval". The argument is an occurrence action of the event, the logical relationship represents a relationship between the event and the argument, the second time point is a time at which the event occurs, and the second time interval is a time interval between the second time point and a current time point.

The electronic device 100 stores the entity knowledge based on a third 5-tuple structure. The third 5-tuple structure is "third entity: third time point-first association weight-fourth entity-second association weight-fifth entity". The third time point is a time at which the third entity occurs, the first association weight is a degree of association between the third entity and the fourth entity, and the second association weight is a degree of association between the fourth entity and the fifth entity.

The electronic device constructs the personal knowledge graph of the user based on the relationship knowledge of the predetermined structure, the event knowledge of the predetermined structure, and the entity knowledge of the predetermined structure.

Specifically, for constructing the personal knowledge graph by the electronic device 100, refer to the embodiment in S703. Details are not described herein in this application.

The electronic device 100 may further update the personal knowledge graph.

The electronic device 100 may delete personal data from the personal knowledge graph, to update the personal knowledge graph.

Specifically, the electronic device deletes the relationship knowledge whose first time interval is greater than a first threshold from the personal knowledge graph; and/or the electronic device deletes the event knowledge whose second time interval is greater than the first threshold from the personal knowledge graph; and/or the electronic device determines a third time interval between the third time point and the current time point based on the third time point; and the electronic device deletes the entity knowledge whose third time interval is greater than the first threshold from the personal knowledge graph.

In addition, the electronic device 100 may add new personal data to the personal knowledge graph.

Specifically, the electronic device 100 obtains the first personal data at regular intervals, and adds the first personal data to the personal knowledge graph.

S1003. The electronic device 100 obtains parameter information of first advertisement content from an advertisement server 200.

The electronic device may receive the parameter information of the first advertisement content from the advertisement server. The parameter information may be information such as a type, a link address, and a size of the first advertisement content. The first advertisement content may include one or more advertisements.

The first advertisement content is any one or more of the following: a picture, a video, text, audio, and the like. The first advertisement content may include one or more advertisements.

S1004. The electronic device 100 obtains parameter information of second advertisement content from the parameter information of the first advertisement content based on the personal knowledge graph.

The electronic device may obtain the parameter information of the second advertisement content from the parameter information of the first advertisement content based on the personal knowledge graph in one or more of the following manners: Manner 1: The electronic device retains parameter information of all advertisements in the parameter information of the first advertisement content, and the electronic device only ranks the first advertisement content in descending order of predicted preference values of the user for types of the advertisements, to obtain the parameter information of the second advertisement content. Manner 2: The electronic device selects parameter information of some advertisements from the parameter information of the first advertisement content, to obtain the parameter information of the second advertisement content. Specifically, the electronic device ranks the first advertisement content in descending order of predicted preference values of the user for types of advertisements, and retains only parameter information of an advertisement whose predicted preference value of the user is greater than a first threshold, to obtain the parameter information of the second advertisement content.

The second advertisement content is any one or more of the following: a picture, a video, text, audio, and the like. The second advertisement content may include one or more advertisements.

Specifically, the electronic device 100 trains a re-ranking model based on the personal knowledge graph, to obtain a first model, and the electronic device obtains the parameter information of the second advertisement content from the parameter information of the first advertisement content by using the first model.

Specifically, that the electronic device 100 trains a re-ranking model based on the personal knowledge graph may include the following content:

The electronic device obtains a historical behavior of the user and historical advertisement information displayed by the electronic device; the electronic device uses the historical advertisement information and the personal knowledge graph as an input to the re-ranking model, where the re-ranking model outputs a first result; and the electronic device compares the first result with the historical behavior of the user, and modifies a parameter of the re-ranking model until the first result that is output by the re-ranking model falls within a preset range, to obtain the first model.

S1005. The electronic device 100 obtains the second advertisement content based on the parameter information of the second advertisement content.

The electronic device 100 obtains the second advertisement content based on the parameter information (for example, a link address) of the second advertisement content.

S1006. The electronic device 100 displays the second advertisement content on a display.

For displaying the second advertisement content on the display by the electronic device 100, refer to the following manners:

Manner 1: The electronic device plays the one or more advertisements in the second advertisement content in descending order of predicted preference values of the user in the second advertisement content.

Manner 2: The electronic device displays an advertisement that corresponds to a largest predicted preference value of the user in the second advertisement content.

Manner 3: The electronic device plays the one or more advertisements in the second advertisement content in descending order of predicted preference values of the user in the second advertisement content, and blocks one or more advertisements played by the electronic device in a first time period in the second advertisement content.

After the electronic device 100 completely displays the second advertisement content, the electronic device 100 may obtain viewing data of the user for the second advertisement content, where the viewing data includes advertisement types of one or more advertisements viewed by the user in the second advertisement content and advertisement types of one or more advertisements closed by the user in the second advertisement content; and the electronic device updates the first model based on the viewing data. In this way, the electronic device updates the first model based on the data of viewing an advertisement by the user, so that the first model recommends an advertisement of a type viewed by the user for a largest quantity of times to the user when recommending an advertisement to the user next time, to better meet a requirement of the user.

In the following embodiments of this application, after the electronic device 100 constructs the personal knowledge graph based on the personal data of the user, an application in the electronic device 100 may ask for consent of the user to obtain the personal knowledge graph, and the application may perform personalized recommendation for the user based on the personal knowledge graph. In this way, the application can obtain the personal knowledge graph only after obtaining consent of the user, which fully respects personal privacy of the user. In addition, the application performs personalized recommendation for the user based on the personal knowledge graph. In this way, content recommended by the application to the user better matches a behavioral characteristic of the user.

An existing content display method is first described.

After the user uses the electronic device 100 for a time period, the user downloads a new application (for example, a first application) from an application store. The first application prompts the user to register personal information and log in. In addition, the first application may prompt the user to select content that the user is interested in, and the first application recommends related content that the user is interested in to the user for viewing.

For example, the foregoing application scenario is described below with reference to the accompanying drawings.

Figure 11A:
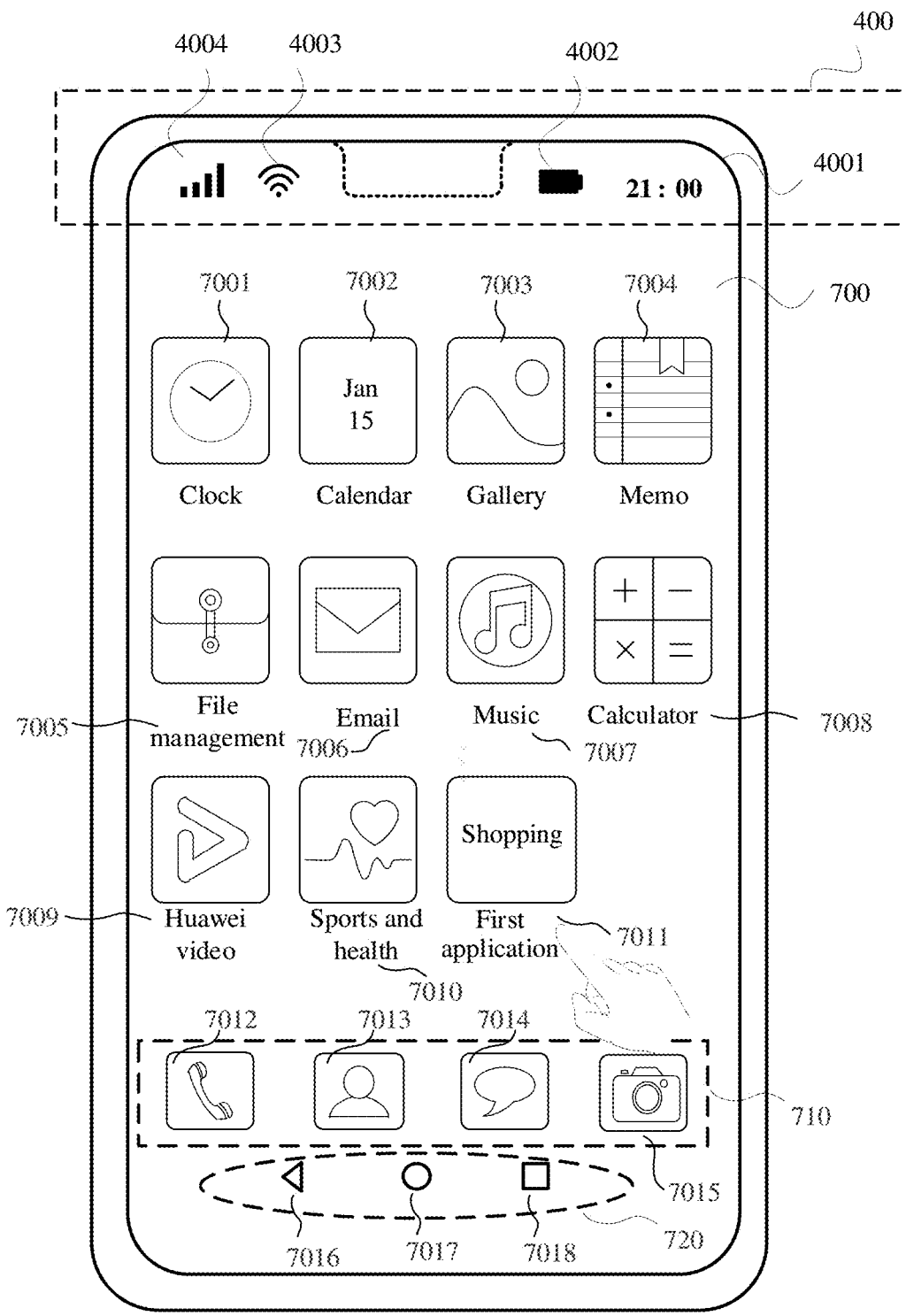
FIG. 11A to FIG. 11C are diagrams of another group of UIs according to an embodiment of this application.

FIG. 11A shows an example of a user interface 700 used for an application menu on an electronic device 100.

The user interface 700 may include a status bar 400, a tray 710 that includes a frequently used application icon, a navigation bar 720, and other application icons.

The tray 710 that includes a frequently used application icon may display a phone icon 7012, a contacts icon 7013, a messaging icon 7014, and a camera icon 7015.

The navigation bar 720 may include system navigation buttons such as a back button 7016, a home screen (Home screen) button 7017, and an outgoing task history button 7018. When detecting that the user taps the back button 7016, the electronic device 100 may display a previous page of a current page. When detecting that the user taps the home screen button 7017, the electronic device 100 may display a home screen. When detecting that the user taps the outgoing call task history button 7018, the electronic device 100 may display a task recently opened by the user. Alternatively, there may be other names for the navigation buttons. This is not limited in this application. Each navigation button in the navigation bar 720 is not limited to a virtual button, and may be implemented as a physical button.

The other application icons may be, for example, a clock icon 7001, a calendar icon 7002, a gallery icon 7003, a memo icon 7004, a file management icon 7005, an email icon 7006, a music icon 7007, a calculator icon 7008, a Huawei video icon 7009, a sports and health icon 7010, and a first application icon 7011.

The first application is an application that has not been used after being downloaded by the user from the application store. The first application may be a shopping application, an electronic book application, a video application, or the like. The application scenario is described by using an example in which the first application is a shopping application.

Figure 11B:
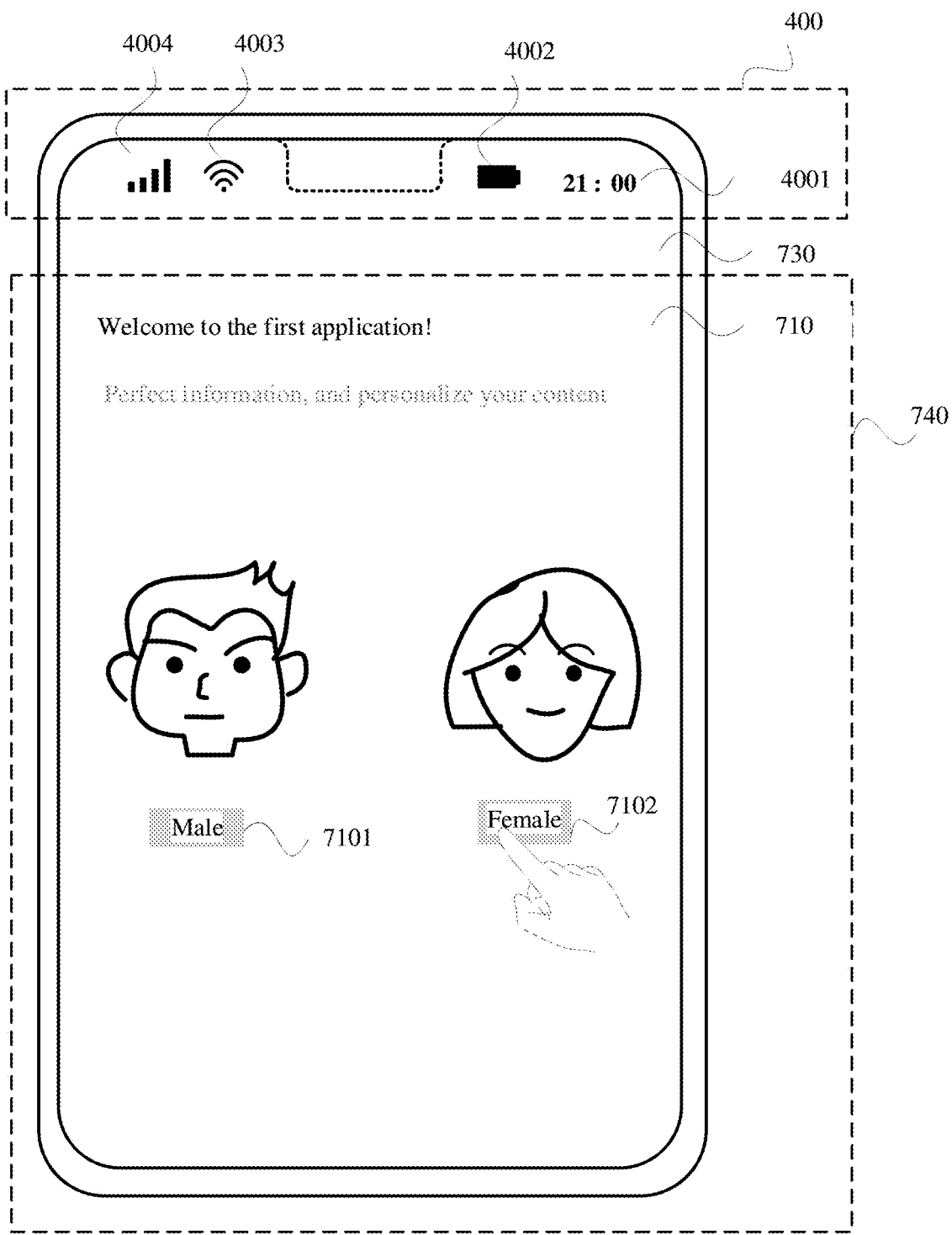

As shown in FIG. 11A, the first application icon 7011 may receive a tap operation performed by the user, and in response to the tap operation performed by the user, the electronic device 100 displays an example user interface 730 shown in FIG. 11B.

The user interface 730 includes a status bar 400 and a gender selection interface 740.

The gender selection interface 740 includes a control 7101 and a control 7102.

The control 7101 may receive a tap operation performed by the user, and in response to the tap operation performed by the user, the first application recommends an item that a male is interested in to the user for viewing.

The control 7102 may receive a tap operation performed by the user, and in response to the tap operation performed by the user, the first application recommends an item that a female is interested in to the user for viewing.

Figure 11C:
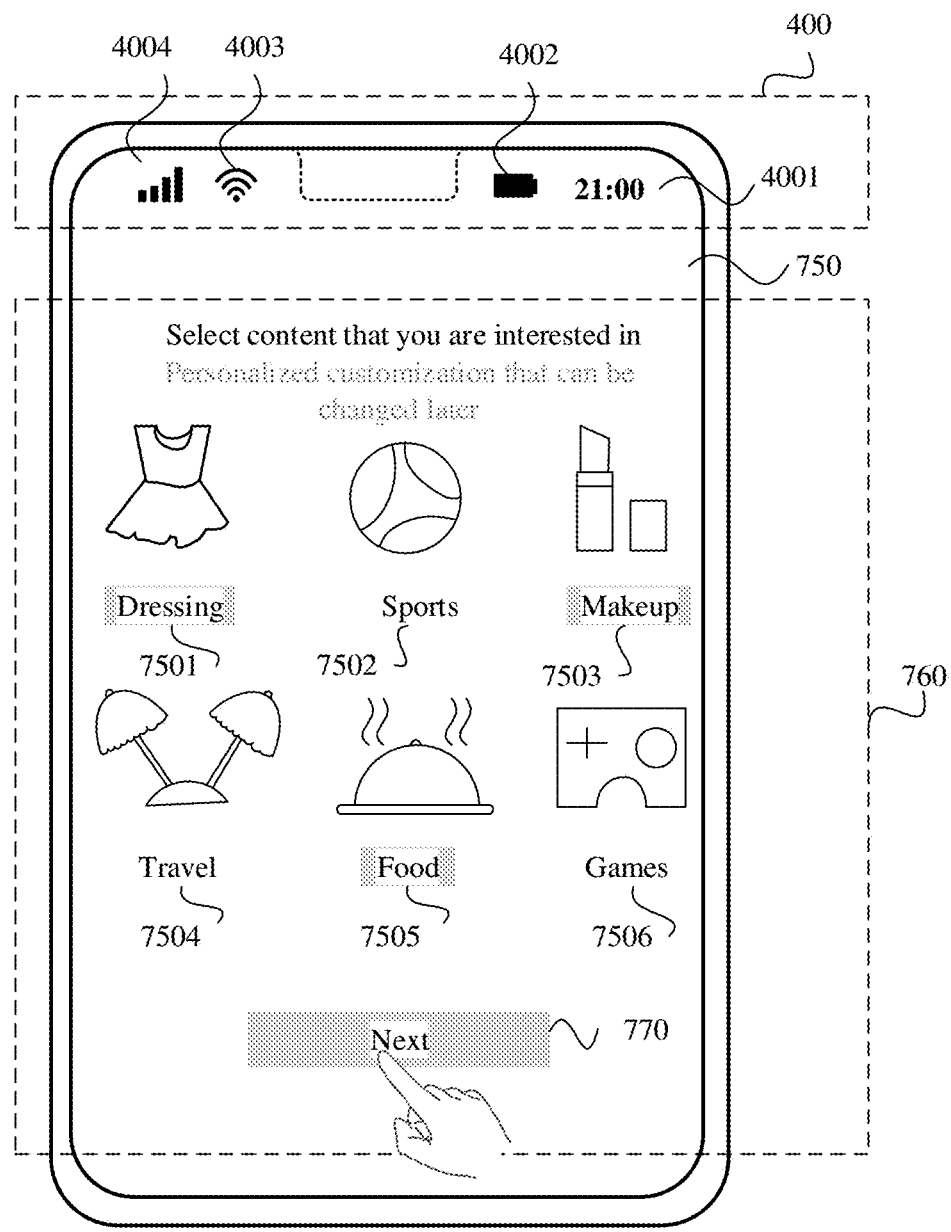

For example, as shown in FIG. 11B, the control 7102 receives a tap operation performed by the user, and in response to the tap operation performed by the user, the electronic device 100 displays an example user interface 750 shown in FIG. 11C.

The user interface 750 includes a status bar 400 and a personalized recommendation selection interface 760.

The personalized recommendation selection interface 760 includes a plurality of recommendation theme controls and a "Next" control 770.

The plurality of recommendation theme controls may include a "Dressing" control 7501, a "Sports" control 7502, a "Makeup" control 7503, a "Travel" control 7504, a "Food" control 7505, and a "Games" control 7506. The plurality of recommendation theme controls may further include another recommendation control. This is not limited herein.

Any one of the plurality of recommendation theme controls may receive a tap and selection operation performed by the user, and in response to the tap operation performed by the user, the first application recommends a theme that the user is interested in to the user for viewing.

For example, if the user is interested in makeup, dressing, and food, the "Dressing" control 7501, the "Makeup" control 7503, and the "Food" control 7505 receive a tap and selection operation performed by the user, the "Next" control 770 receives and responds to the tap operation performed by the user, the electronic device 100 displays an example user interface of the first application, and content displayed in the user interface of the first application is makeup content, dressing content, and food content selected by the user. In this way, the first application may recommend related content to the user based on a preference of the user.

However, it may be learned from the foregoing embodiment that when the user opens an application that has not been used, the user needs to first select a gender, and then select theme content that the user is interested in. After the user completes selection, the user needs to tap "next" to enter the application. It may be learned from the foregoing operation that in this recommendation manner of an application, there is a complex operation and user experience is poor.

The first application may recommend, based on the personal knowledge graph provided in this embodiment of this application, content that the user is interested in. In this way, the user does not need to perform a series of operations to select content that the user is interested in. In addition, the content that the user is interested in and that is recommended by the first application based on the personal knowledge graph is more accurate.

When the user opens the first application, the first application asks for a request of the user to obtain information such as the personal knowledge graph. In this case, the first application obtains data such as the personal knowledge graph only when the user authorizes the first application. In this way, personal privacy of the user is fully respected.

Figure 12:
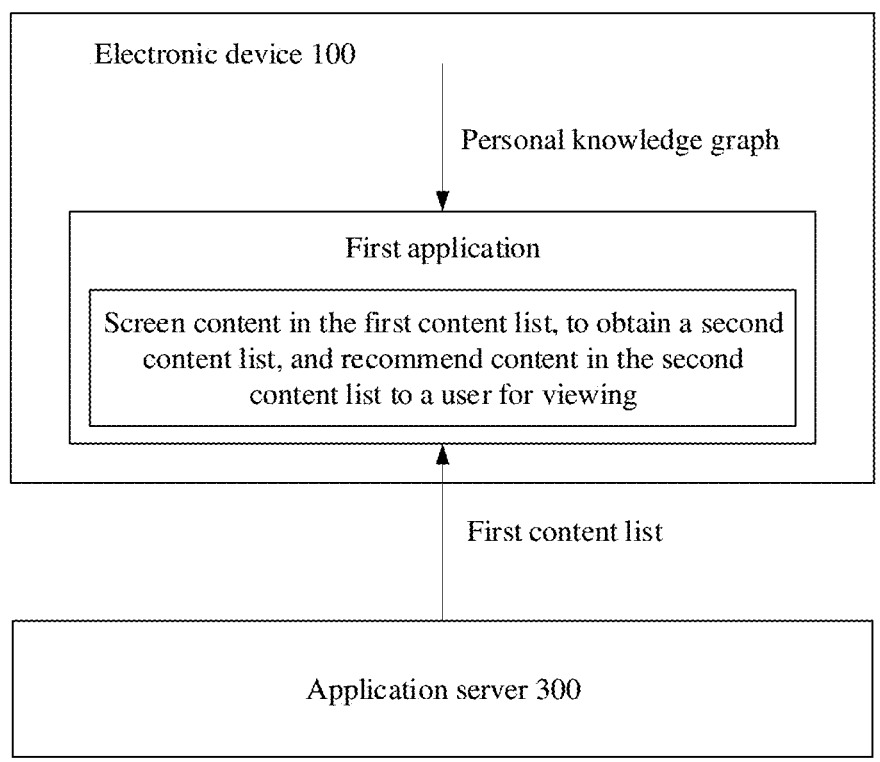
FIG. 12 is a schematic architectural diagram of another system according to an embodiment of this application.

FIG. 12 is a schematic architectural diagram of another system according to an embodiment of this application. The system includes an electronic device 100 and an application server 300.

The application server 300 sends a first content list to a first application in the electronic device 100, where the first content list may include a plurality of pieces of content, and the first application receives the first content list sent by the application server 300.

After the first application obtains a request of a user, the electronic device 100 sends a personal knowledge graph to the first application. The first application receives the personal knowledge graph sent by the electronic device 100. After the first application obtains the first content list, the first application screens the plurality of pieces of content in the first content list based on the personal knowledge graph, to obtain a second content list, and the first application recommends content in the second content list to the user for viewing.

Figure 12A:
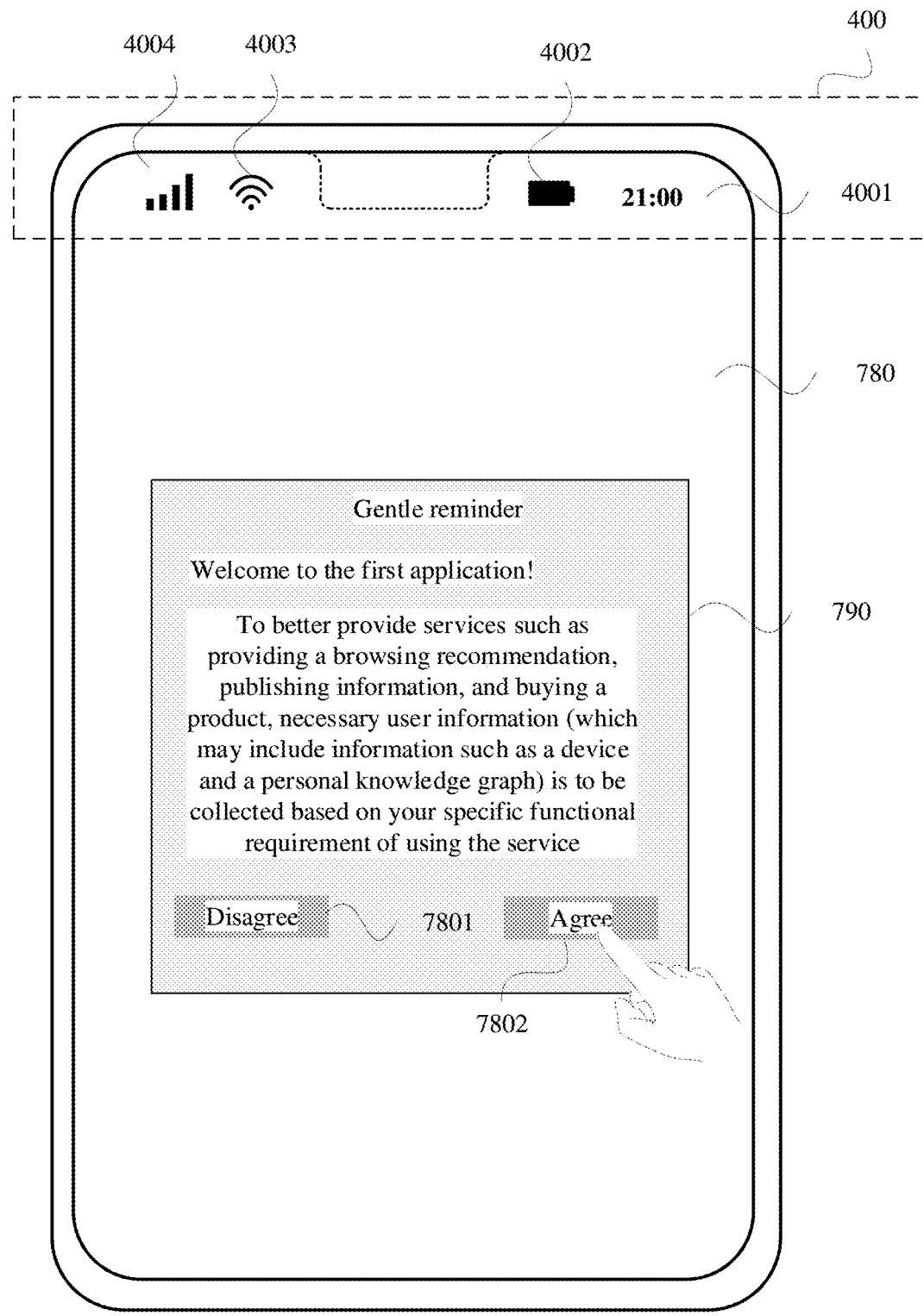
FIG. 12A is a diagram of a UI according to an embodiment of this application.

For example, FIG. 12A is an example user interface 780 for obtaining a request of a user by a first application.

The user interface 780 includes a status bar 400 and a prompt box 790.

The prompt box 790 displays prompt information, a "Disagree" control 7801, and an "Agree" control 7802. The prompt information is used to prompt the user whether to agree with the first application to obtain information such as the personal knowledge graph. The prompt information includes "To better provide services such as providing a browsing recommendation, publishing information, and buying a product, necessary user information (which may include information such as a device and the personal knowledge graph) is to be collected based on your specific functional requirement of using the service".

The "Disagree" control 7801 may accept a tap operation performed by the user. In response to the tap operation performed by the user, the user does not agree with the first application to obtain data such as the personal knowledge graph. In this case, the first application does not recommend personalized content to the user.

The "Agree" control 7802 may accept a tap operation performed by the user. In response to the tap operation performed by the user, the user agrees with the first application to obtain data such as the personal knowledge graph. In this case, the first application recommends content similar to a personal behavioral characteristic of the user to the user based on data such as the personal knowledge graph, for example, recommends similar content to the user for viewing based on a preference and a consumption level of the user.

In this way, the first application recommends content similar to the personal behavioral characteristic of the user to the user based on data such as the personal knowledge graph, and the user does not need to manually select content that the user is interested in. In this way, there is a simple user operation, and a requirement of the user is better met because the content that the user is interested in and that is recommended by the first application based on the personal knowledge graph is more accurate.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any available medium that can be accessed by a computer, or a data storage device such as a server or a data center into which one or more available media are integrated. The available medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the methods in the foregoing embodiments may be implemented by a computer program by instructing related hardware. The program may be stored in a computer-readable storage medium. When the program is executed, the procedures in the foregoing method embodiments may be performed. The foregoing storage medium includes any medium that can store program code, for example, a ROM, a random access memory RAM, a magnetic disk, or an optical disc.

What is claimed is:

1. A method comprising:
   obtaining, by a terminal side electronic device, and storing, by the terminal side electronic device and onboard the terminal side electronic device, first personal data of a user, wherein the first personal data is personal information of the user;
   constructing, by the terminal side electronic device and onboard the terminal side electronic device, and storing, by the terminal side electronic device and onboard the terminal side electronic device, a personal knowledge graph based on the first personal data stored on the terminal side electronic device, wherein the personal knowledge graph comprises the first personal data and a time at which the first personal data is generated;
   obtaining, by the terminal side electronic device, parameter information of first advertisement content from an advertisement server of a server side, wherein the parameter information of the first advertisement content comprises one or more types of one or more advertisements in the first advertisement content and a link address of the first advertisement content, the first advertisement content is obtained based on screening a plurality of advertisements using group data;

obtaining, by the terminal side electronic device, parameter information of second advertisement content from the parameter information of the first advertisement content based on the personal knowledge graph;

obtaining, by the terminal side electronic device, the second advertisement content based on the parameter information of the second advertisement content, wherein the second advertisement content comprises at least one of the one or more advertisements; and displaying, by the terminal side electronic device, the second advertisement content on a display.

2. The method according to claim 1, wherein constructing and storing, by the terminal side electronic device, the personal knowledge graph based on the first personal data comprises:

obtaining, by the terminal side electronic device, second personal data from the first personal data, wherein the second personal data comprises relationship knowledge, event knowledge, and entity knowledge;

storing, by the terminal side electronic device, the relationship knowledge, the event knowledge, and the entity knowledge based on a predetermined structure; and constructing, by the terminal side electronic device, the personal knowledge graph of the user based on the relationship knowledge of the predetermined structure, the event knowledge of the predetermined structure, and the entity knowledge of the predetermined structure.

3. The method according to claim 2, wherein before obtaining, by the terminal side electronic device, the second personal data from the first personal data, the method further comprises:

converting, by the terminal side electronic device, the first personal data into text information; and performing, by the terminal side electronic device, sentence segmentation, word segmentation, and part-of-speech tagging on the text information, wherein the sentence segmentation, the word segmentation, and the part-of-speech tagging marks the text information with a plurality of tags; and wherein obtaining, by the terminal side electronic device, the second personal data from the first personal data comprises:

obtaining, by the terminal side electronic device from the text information, a plurality of words based on a subset of the plurality of tags, wherein the plurality of words represents core information in the second personal data.

4. The method according to claim 2, wherein the predetermined structure is a 5-tuple structure; and storing, by the terminal side electronic device, the relationship knowledge based on the predetermined structure comprises:

storing, by the terminal side electronic device, the relationship knowledge based on a first 5-tuple structure, wherein the first 5-tuple structure is "first entity-relationship-second entity-first time point-first time interval", a relationship in the first 5-tuple structure is between a first entity and a second entity in the first 5-tuple structure, a first time point in the first 5-tuple structure is a time at which the relationship in the first 5-tuple structure is established between the first entity and the second entity, and a first time interval in the first 5-tuple structure is a time interval between the first time point in the first 5-tuple structure and a current time point.

5. The method according to claim 2, wherein the predetermined structure is a 5-tuple structure; and storing, by the terminal side electronic device, the event knowledge based on the predetermined structure comprises:

storing, by the terminal side electronic device, the event knowledge based on a second 5-tuple structure, wherein the second 5-tuple structure is "event-argument-logical relationship-second time point-second time interval", an argument in the second 5-tuple structure is an occurrence action of an event in the second 5-tuple structure, a logical relationship in the second 5-tuple structure is between the event and the argument in the second 5-tuple structure, a second time point in the second 5-tuple structure is a time at which the event occurs, and a second time interval in the second 5-tuple structure is between the second time point and a current time point.

6. The method according to claim 2, wherein the predetermined structure is a 5-tuple structure; and storing, by the terminal side electronic device, the entity knowledge based on the predetermined structure comprises:

storing, by the terminal side electronic device, the entity knowledge based on a third 5-tuple structure, wherein the third 5-tuple structure is "third entity: third time point-first association weight-fourth entity-second association weight-fifth entity", a third time point in the third 5-tuple structure is a time at which a third entity in the third 5-tuple structure occurs, a first association weight in the third 5-tuple structure is a degree of association between the third entity and a fourth entity in the third 5-tuple structure, and a second association weight in the third 5-tuple structure is a degree of association between the fourth entity and a fifth entity in the third 5-tuple structure.

7. The method according to claim 6, wherein the method further comprises:

deleting, by the terminal side electronic device from the personal knowledge graph, at least a portion of the relationship knowledge having a first time interval greater than a first threshold; or deleting, by the terminal side electronic device from the personal knowledge graph, at least a portion of the event knowledge having a second time interval greater than the first threshold; or determining, by the terminal side electronic device, a third time interval between the third time point and a current time point based on the third time point for the entity knowledge; and deleting, by the terminal side electronic device from the personal knowledge graph, at least a portion of the entity knowledge having the third time interval greater than the first threshold.

8. The method according to claim 2, wherein before obtaining, by the terminal side electronic device, the second personal data from the first personal data, the method further comprises:

converting, by the terminal side electronic device, the first personal data into text information; and performing, by the terminal side electronic device, sentence segmentation, word segmentation, and part-of-speech tagging on the text information; and wherein obtaining, by the terminal side electronic device, the second personal data from the first personal data comprises:

obtaining, by the terminal side electronic device from the text information, a word that belongs to a preset part of speech.

9. The method according to claim 8, wherein after obtaining, by the terminal side electronic device, the word that belongs to the preset part of speech, the method further comprises:

obtaining, by the terminal side electronic device, a first word that appears once in the text information; and when a second word appears more than once in the text information, obtaining, by the terminal side electronic device, the second word once from the text information; and obtaining, by the terminal side electronic device, the second personal data based on the obtained first word and second word.

10. The method according to claim 1, wherein the terminal side electronic device obtains the first personal data of the user at regular intervals.

11. The method according to claim 1, wherein the first advertisement content is one or more of following: a picture, a video, text, or audio.

12. The method according to claim 1, wherein after constructing and storing, by the terminal side electronic device, the personal knowledge graph based on the first personal data, the method further comprises:

obtaining, by the terminal side electronic device, a historical behavior of the user and historical advertisement information displayed by the terminal side electronic device;

training, by the terminal side electronic device, a re-ranking model with the historical behavior, the historical advertisement information and the personal knowledge graph, to obtain a first model, the training comprises:

generating, by the terminal side electronic device, a first result output by the re-ranking model with the historical advertisement information and the personal knowledge graph as an input to the re-ranking model;

comparing, by the terminal side electronic device, the first result with the historical behavior of the user, and based thereon, modifying, by the terminal side electronic device, a parameter of the re-ranking model; and repeating, by the terminal side electronic device, steps of the generating and the comparing until the first result that is output by the re-ranking model falls within a preset range; and wherein obtaining, by the terminal side electronic device, the parameter information of the second advertisement content from the parameter information of the first advertisement content based on the personal knowledge graph comprises:

obtaining, by the terminal side electronic device, the parameter information of the second advertisement content from the parameter information of the first advertisement content based on the first model.

13. The method according to claim 12, wherein obtaining, by the terminal side electronic device, the parameter information of the second advertisement content from the parameter information of the first advertisement content based on the first model comprises:

ranking, by the terminal side electronic device based on the first model, the one or more types of the one or more advertisements in the first advertisement content in a descending order of one or more predicted preference values of the one or more advertisements given by the user, to obtain the parameter information of the second advertisement content; or ranking, by the terminal side electronic device based on the first model, the one or more types of the one or more advertisements in the first advertisement content in the descending order of one or more predicted preference values of the one or more advertisements given by the user, and obtaining, by the terminal side electronic device, a type of an advertisement having a predicted preference value greater than a first threshold, to obtain the parameter information of the second advertisement content.

14. The method according to claim 12, wherein after displaying, by the terminal side electronic device, the second advertisement content on the display, the method further comprises:

obtaining, by the terminal side electronic device, viewing data of the user for the second advertisement content, wherein the viewing data comprises one or more advertisement types of one or more advertisements viewed by the user in the second advertisement content and one or more advertisement types of one or more advertisements closed by the user in the second advertisement content; and updating, by the terminal side electronic device, the first model based on the viewing data.

15. The method according to claim 1, wherein the personal information of the user comprises one or more of following: a gender, an age, a personality, a hobby, an interpersonal relationship, income, contact information, a call record, a short message service message, memo information, a residence address, or a weather condition at the residence address.

16. The method according to claim 1, wherein displaying, by the terminal side electronic device, the second advertisement content on the display comprises:

playing, by the terminal side electronic device, the one or more advertisements in the second advertisement content in a descending order of one or more predicted preference values of the one or more advertisements given by the user;

displaying, by the terminal side electronic device, an advertisement that corresponds to a largest predicted preference value in the one or more advertisements; or playing, by the terminal side electronic device, the one or more advertisements in the second advertisement content in the descending order of one or more predicted preference values of the one or more advertisements given by the user, and blocking the one or more advertisements played by the terminal side electronic device in a first time period in the second advertisement content.

17. A terminal side electronic device, wherein the terminal side electronic device comprises one or more processors, one or more memories that are non-transitory, and a display, the one or more memories and the display are coupled to the one or more processors, the one or more memories are configured to store computer program code, the computer program code comprises computer instructions, and the one or more processors invoke the computer instructions to cause the terminal side electronic device to perform:

obtaining, at the terminal side electronic device, and storing, onboard the terminal side electronic device, first personal data of a user, wherein the first personal data is personal information of the user;

constructing, at the terminal side electronic device and onboard the terminal side electronic device, and storing, onboard the terminal side electronic device, a personal knowledge graph based on the first personal data, wherein the personal knowledge graph comprises the first personal data and a time at which the first personal data is generated;

obtaining parameter information of first advertisement content from an advertisement server of a server side, wherein the parameter information of the first advertisement content comprises one or more types of one or more advertisements in the first advertisement content and a link address of the first advertisement content, the first advertisement content is obtained based on screening a plurality of advertisements using group data;

obtaining parameter information of second advertisement content from the parameter information of the first advertisement content based on the personal knowledge graph;

obtaining the second advertisement content based on the parameter information of the second advertisement content, wherein the second advertisement content comprises at least one of the one or more advertisements; and displaying the second advertisement content on the display.

18. A non-transitory computer-readable storage medium comprising instructions, wherein when the instructions are run on a terminal side electronic device, the terminal side electronic device is caused to perform:

obtaining, by the terminal side electronic device and onboard the terminal side electronic device, and storing, by the terminal side electronic device and onboard the terminal side electronic device, first personal data of a user, wherein the first personal data is personal information of the user;

constructing, by the terminal side electronic device and onboard the terminal side electronic device, and storing, by the terminal side electronic device and onboard the terminal side electronic device, a personal knowledge graph based on the first personal data, wherein the personal knowledge graph comprises the first personal data and a time at which the first personal data is generated;

obtaining parameter information of first advertisement content from an advertisement server of a server side, wherein the parameter information of the first advertisement content comprises one or more types of one or more advertisements in the first advertisement content and a link address of the first advertisement content, the first advertisement content is obtained based on screening a plurality of advertisements using group data;

obtaining, by the terminal side electronic device, parameter information of second advertisement content from the parameter information of the first advertisement content based on the personal knowledge graph;

obtaining, by the terminal side electronic device, the second advertisement content based on the parameter information of the second advertisement content, wherein the second advertisement content comprises at least one of the one or more advertisements; and displaying, by the terminal side electronic device, the second advertisement content on a display.

\* \* \* \* \*